US012431091B2

(12) United States Patent
Choi

(10) Patent No.: US 12,431,091 B2
(45) Date of Patent: Sep. 30, 2025

(54) DISPLAY APPARATUS FOR DETECTING SCAN OUTPUT AND DRIVING METHOD THEREOF

(71) Applicant: LG Display Co., Ltd., Seoul (KR)

(72) Inventor: Ji Su Choi, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/954,309

(22) Filed: Nov. 20, 2024

(65) Prior Publication Data

US 2025/0246150 A1 Jul. 31, 2025

(30) Foreign Application Priority Data

Jan. 31, 2024 (KR) ........................ 10-2024-0015224

(51) Int. Cl.
*G09G 3/3266* (2016.01)

(52) U.S. Cl.
CPC ... *G09G 3/3266* (2013.01); *G09G 2310/0289* (2013.01); *G09G 2310/08* (2013.01)

(58) Field of Classification Search
CPC ........ G09G 3/3266; G09G 3/20; G09G 3/006; G09G 3/3677; G09G 3/3648; G09G 2310/08; G09G 2310/0289; G09G 2310/021; G09G 2310/0267; G09G 2310/0264; G09G 2310/0286; G09G 2330/12
See application file for complete search history.

(56) References Cited

U.S. PATENT DOCUMENTS

| | | | | |
|---|---|---|---|---|
| 8,520,076 | B2 | 8/2013 | Jang et al. | |
| 10,268,293 | B2 * | 4/2019 | Hsu | G09G 3/3677 |
| 10,338,727 | B2 * | 7/2019 | Yu | G06F 3/04166 |
| 10,650,721 | B2 * | 5/2020 | Pyun | G09G 3/3611 |
| 11,790,853 | B2 * | 10/2023 | Jeong | G09G 3/3266 345/212 |
| 2008/0309605 | A1 | 12/2008 | Jang et al. | |
| 2010/0026668 | A1 * | 2/2010 | Lin | G09G 3/3611 345/204 |
| 2011/0148825 | A1 * | 6/2011 | Ueno | G09G 3/3677 345/204 |

(Continued)

FOREIGN PATENT DOCUMENTS

| | | | |
|---|---|---|---|
| KR | 10-1502366 | B1 | 3/2015 |
| KR | 10-1580092 | B1 | 12/2015 |

*Primary Examiner* — Nitin Patel
*Assistant Examiner* — Amen W Bogale
(74) *Attorney, Agent, or Firm* — Fenwick & West LLP

(57) ABSTRACT

A display device includes a first-side stage that supplies a first-side scan signal to a first side of a gate line, a second-side stage that supplies a second-side scan signal having the same phase as the first-side scan signal to a second side of the gate line, a first output and sensing circuit connected to the first-side stage through a first clock line, and a second output and sensing circuit connected to the second-side stage through a second clock line, wherein the first-side stage operates in an output mode and the second-side stage operates in a bypass mode to detect an output characteristic of the first-side scan signal in the second output and sensing circuit, and the second-side stage operates in the output mode and the first-side stage operates in the bypass mode to detect an output characteristic of the second-side scan signal in the first output and sensing circuit.

18 Claims, 19 Drawing Sheets

(56) References Cited

U.S. PATENT DOCUMENTS

| | | | | |
|---|---|---|---|---|
| 2015/0269910 | A1* | 9/2015 | Liao | G09G 3/20<br>345/100 |
| 2017/0278441 | A1* | 9/2017 | Ooki | G09G 3/3648 |
| 2019/0279585 | A1* | 9/2019 | Suzuki | G09G 3/20 |
| 2020/0090571 | A1* | 3/2020 | Li | G09G 3/20 |
| 2021/0241663 | A1* | 8/2021 | Li | G11C 19/287 |
| 2022/0208059 | A1* | 6/2022 | Kim | G09G 3/3208 |
| 2024/0169874 | A1* | 5/2024 | Choi | G09G 3/006 |

* cited by examiner

DISPLAY APPARATUS FOR DETECTING SCAN OUTPUT AND DRIVING METHOD THEREOF

CROSS-REFERENCE TO RELATED APPLICATION

This application claims the benefit of the Republic of Korea Patent Application No. 10-2024-0015224 filed on Jan. 31, 2024, which is hereby incorporated by reference in its entirety.

BACKGROUND

Field of Technology

The present disclosure relates to a display device for detecting a scan output and a driving method thereof.

Discussion of the Related Art

Display device includes pixels arranged as a matrix type and supply image data to the pixels in synchronization with a scan signal, and thus, implement luminance corresponding to the image data in the pixels.

Display device includes a gate driver for supplying a scan signal to gate lines. The gate driver includes a plurality of stages. To decrease a design area of gate drivers, gate drivers may be designed so that four scan signals are controlled by a common node control circuit in each stage. Such a stage is referred to as an NSDC-type stage.

In NSDC-type stages, four scan clocks are output as four scan signals by a voltage of a Q node. However, the voltage of the Q node differs at rising edges of the four scan clocks, and moreover, the voltage of the Q node differs at falling edges of the four scan clocks, causing an output characteristic deviation between the four scan signals.

SUMMARY

To overcome the aforementioned problem of the related art, the present disclosure may provide a display device and a driving method thereof, which may detect an output characteristic deviation of scan signals.

Moreover, the present disclosure may provide a display device and a driving method thereof, which may detect and compensate for an output characteristic deviation of scan signals.

To achieve these objects and other advantages and in accordance with the purpose of the disclosure, as embodied and broadly described herein, a display device includes a gate line, a first-side stage configured to supply a first-side scan signal to one side of the gate line, a second-side stage configured to supply a second-side scan signal, having the same phase as a phase of the first-side scan signal, to the other side of the gate line, a first output and sensing circuit connected to the first-side stage through a first clock line, and a second output and sensing circuit connected to the second-side stage through a second clock line, wherein the first-side stage operates in an output mode and the second-side stage operates in a bypass mode, so as to detect an output characteristic of the first-side scan signal in the second output and sensing circuit, and the second-side stage operates in the output mode and the first-side stage operates in the bypass mode, so as to detect an output characteristic of the second-side scan signal in the first output and sensing circuit.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
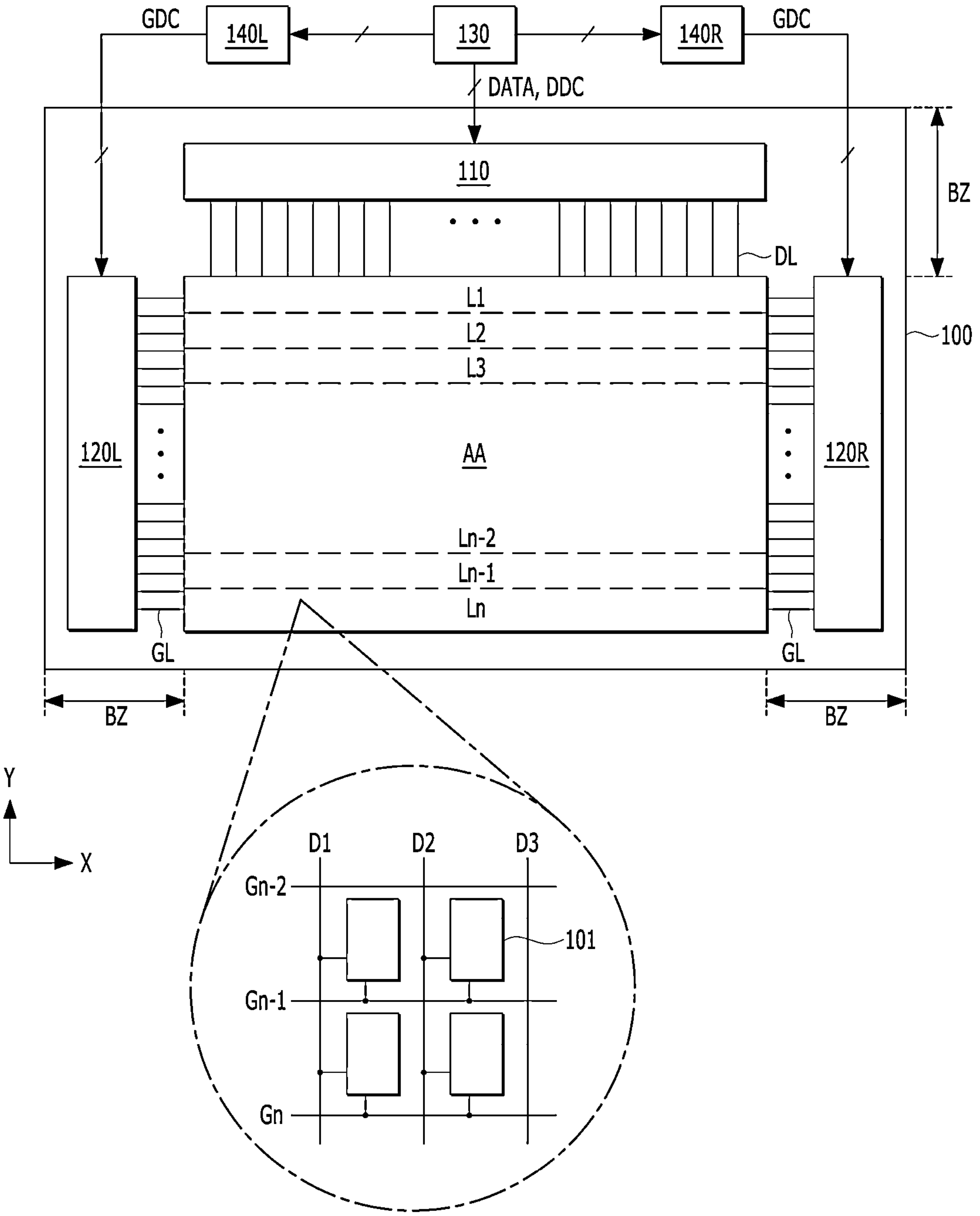
FIG. 1 is a block diagram illustrating a display device according to one embodiment of the present disclosure.

Hereinafter, the present disclosure will be described more fully with reference to the accompanying drawings, in which exemplary embodiments of the disclosure are shown. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Furthermore, the present disclosure is only defined by scopes of claims.

The shapes, sizes, ratios, angles, numbers and the like disclosed in the drawings for description of various embodiments of the present disclosure to describe embodiments of the present disclosure are merely exemplary and the present disclosure is not limited thereto. Like reference numerals refer to like elements throughout. Throughout this specification, the same elements are denoted by the same reference numerals. As used herein, the terms "comprise", "having," "including" and the like suggest that other parts can be added unless the term "only" is used. As used herein, the singular forms "a", "an", and "the" are intended to include the plural forms as well, unless context clearly indicates otherwise.

Elements in various embodiments of the present disclosure are to be interpreted as including margins of error even without explicit statements.

In describing a position relationship, for example, when a position relation between two parts is described as "on~", "over~", "under~", and "next~", one or more other parts may be disposed between the two parts unless "just" or "direct" is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In the following description, when the detailed description of the relevant known function or configuration is determined to unnecessarily obscure the important point of the present disclosure, the detailed description will be omitted. Hereinafter, embodiments of the present disclosure will be described in detail with reference to the accompanying drawings.

FIG. 1 is a block diagram illustrating a display device according to one embodiment of the present disclosure.

Referring to FIG. 1, a display device according to the present disclosure may be an organic light emitting display device. A display panel 100 may include a screen AA which reproduces an input image. The screen AA may include a pixel array which displays pixel data (hereinafter referred to as "image data") DATA of an input image. The pixel array may include a plurality of data lines DL, a plurality of gate lines GL intersecting with the data lines DL, and a plurality of pixels 101.

The pixels 101 may be arranged on the screen AA in a matrix type defined by the data lines DL and the gate lines GL. The pixels 101 may be arranged as various types, such as a stripe type, a diamond type, and a type shared by pixels 101 emitting lights of the same color, in addition to a matrix type, on the screen AA.

The pixel array may include a plurality of pixel columns and a plurality of pixel lines L1 to Ln intersecting with the pixel columns. Each of the pixel columns may include pixels which are arranged in a Y-axis direction. A pixel line may include pixels which are arranged in an X-axis direction. One vertical period may be one frame period needed for writing image data DATA of one frame in all pixels of the screen. One horizontal period may be a time obtained by dividing one frame period by the number of pixel lines L1 to Ln. One horizontal period may be a time needed for writing the image data DATA of one pixel line, sharing a gate line GL, in pixels of one pixel line.

The pixels 101 may include a red (R) pixel, a green (G) pixel, a blue (B) pixel, so as to implement colors. The pixels 101 may further include a white (W) pixel.

A pixel circuit may include a light emitting device, a driving transistor, one or more switch transistors, and a capacitor. The light emitting device may be implemented as an organic light emitting diode (OLED). A driving current applied to the light emitting device may be adjusted based on a gate-source voltage of the driving transistor. Each of the driving transistor and the switch transistor may include a semiconductor layer which is implemented with amorphous silicon or polysilicon. A semiconductor layer of at least some of transistors may include oxide. The pixel circuit may be connected to a data line DL and a gate line GL. In FIG. 1, "D1 to D3" illustrated in a circle may be data lines, and "Gn-2 to Gn" may be gate lines. Also, each of the pixels 101 of FIG. 1 may include the same pixel circuit.

The pixel circuit may sense a threshold voltage of the driving transistor in a data programming operation performed in one frame period and may allow the sensed threshold voltage to be reflected in a gate-source voltage of the driving transistor, thereby preventing the driving current from being distorted by a threshold voltage shift of the driving transistor.

Touch sensors may be disposed on the display panel 100. The touch sensors may be arranged as an on-cell or add-on type on the screen AA of the display panel 100, or may be implemented as in-cell type touch sensors embedded in the pixel array. A touch input may be sensed through the touch sensors, or may be sensed through only the pixels 101 even without touch sensors.

A display panel driver may include a source driver 110 and a gate driver 120L and 120R. The display panel driver may write image data DATA in the pixels 101 of the display panel 100, based on control by the timing controller 130.

A source driver 110 may convert the image data DATA, received from the timing controller 130, into gamma compensation voltages by using a digital-to-analog converter (DAC) to generate data voltages. The source driver 110 may supply the data voltages to the data lines DL. The data voltages may be supplied to the data lines DL and may be applied to gate electrodes of the driving transistors through the switch transistors of the pixels 101. The source driver 110 may be implemented with a plurality of source driver integrated circuits (ICs) SIC1 to SICn.

The gate driver 120L and 120R may be formed in a bezel region BZ outside a screen which does not display an image, in the display panel 100. The gate driver 120L and 120R may sequentially supply a scan signal, synchronized with a data voltage, to the gate lines GL, based on control by the timing controller 130. The scan signal may select pixel lines L1 to Ln which are charged with the data voltage and may simultaneously activate pixels 101 disposed in corresponding pixel lines L1 to Ln. The gate driver 120L and 120R may output a gate signal by using a plurality of stages and may shift the gate signal. The scan signal may swing between an on level and an off level.

The timing controller 130 may receive video data DATA and a timing signal, synchronized with the video data DATA, from the host system (not shown). The timing signal may include a vertical synchronization signal Vsync, a horizontal synchronization signal Hsync, a clock signal DCLK, and a data enable signal DE. The vertical synchronization signal Vsync may define a vertical period. The horizontal synchronization signal Hsync may define a horizontal period. The data enable signal DE may define a time where the video data DATA is transferred in the vertical period or the horizontal period. The vertical period and the horizontal period may be detected by a method of counting the data enable signal DE, and thus, the vertical synchronization signal Vsync and the horizontal synchronization signal Hsync may be omitted.

The timing controller 130 may generate a source timing control signal DDC for controlling an operation timing of the source driver 110 and a gate timing control signal GDC for controlling an operation timing of the gate driver 120L and 120R, based on the timing signal Vsync, Hsync, and DE received from the host system.

The host system be one of a television (TV), a set-top box, a navigation system, a personal computer (PC), a home theater, an automotive display system, a mobile device, and a wearable device. In the mobile device and the wearable device, the source driver 110, the timing controller 130, and the output and sensing circuit 140L and 140R may be integrated into one driver IC.

To decrease a resistor-capacitor (RC) delay deviation occurring in the display panel 100 having a large screen, the gate driver 120L and 120R may be implemented as a double bank type and may thus supply scan signals having the same phase to the same gate line GL at both sides of the display panel 100. The gate driver 120L and 120R may include a first-side gate driver 120L disposed in a left bezel region BZ of the display panel 100 and a second-side gate driver 120R disposed in a right bezel region BZ of the display panel 100.

The output and sensing circuit 140L and 140R may convert a voltage of the gate timing control signal GDC, output from the timing controller 130, into a gate high voltage VGH and a gate low voltage VGL to supply to the gate driver 120L and 120R. A low-level voltage of the gate timing control signal GDC may be converted into the gate low voltage VGL by the output and sensing circuit 140L and 140R, and a high-level voltage of the gate timing control signal GDC may be converted into the gate high voltage VGH by the output and sensing circuit 140L and 140R.

The output and sensing circuit 140L and 140R may include a first output and sensing circuit 140 140L connected to the first-side gate driver 120L through first signal lines and a second output and sensing circuit 140 140R connected to the second-side gate driver 120R through second signal lines.

Figure 2:
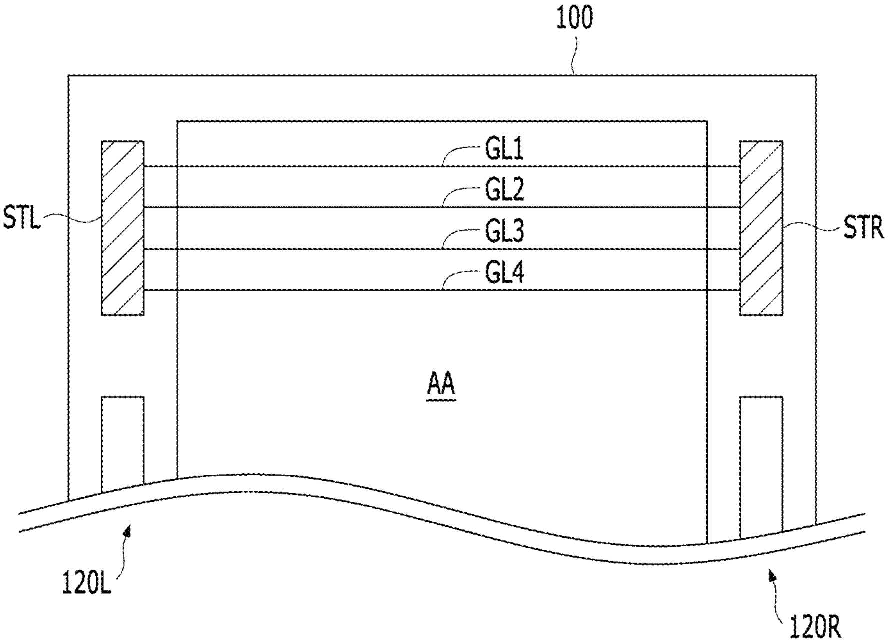
FIG. 2 is a diagram illustrating a connection configuration between NSDC-type stages formed as a double bank type according to one embodiment of the present disclosure.
Figure 3:
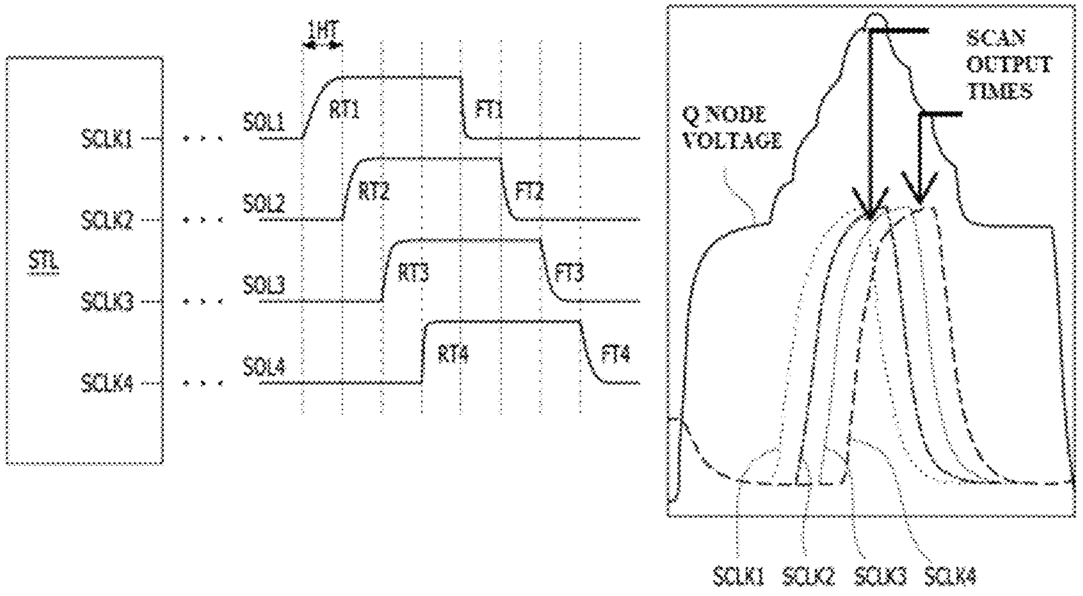
FIG. 3 is a diagram illustrating an output characteristic deviation between first-side scan signals output from a first-side stage according to one embodiment of the present disclosure.
Figure 4:
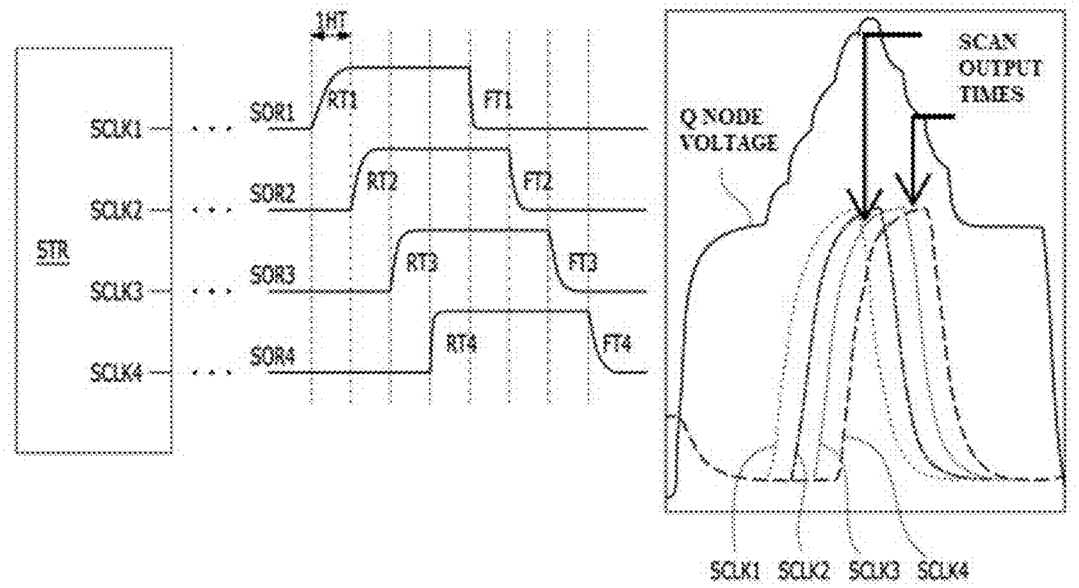
FIG. 4 is a diagram illustrating an output characteristic deviation between second-side scan signals output from a second-side stage according to one embodiment of the present disclosure.

FIG. 2 is a diagram illustrating a connection configuration between NSDC-type stages formed as a double bank type according to one embodiment of the present disclosure. FIG. 3 is a diagram illustrating an output characteristic deviation between first-side scan signals output from a first-side stage according to one embodiment of the present disclosure. FIG. 4 is a diagram illustrating an output characteristic deviation between second-side scan signals output from a second-side stage according to one embodiment of the present disclosure.

Referring to FIG. 2, the first-side gate driver 120L may include a plurality of first-side stages STL connected to one another in cascade. The plurality of first-side stages STL may each be implemented as an NSDC-type stage. Each of the plurality of first-side stages STL may operate based on a common node control circuit to supply four first-side scan signals to four gate lines (for example, GL1 to GL4).

The second-side gate driver 120R may include a plurality of second-side stages STR connected to one another in cascade. The plurality of second-side stages STR may each be implemented as an NSDC-type stage. Each of the plurality of second-side stages STR may operate based on the common node control circuit to supply four second-side scan signals to four gate lines (for example, GL1 to GL4). Here, a first-side scan signal and a second-side scan signal applied to the same gate line may have the same phase.

Referring to FIG. 3, in the first-side stage STL, four scan clocks SCLK1 to SCLK4 may be output as four first-side scan signals SOL1 to SOL4 by a common Q node voltage. The four scan clocks SCLK1 to SCLK4 may be delayed in phase by one horizontal period 1HT.

However, voltages of a Q node corresponding to rising edges of the four scan clocks SCLK1 to SCLK4 may differ, and due to this, a rising delay deviation may occur between the first-side scan signals SOL1 to SOL4. As a voltage of the Q node decreases, a rising delay may increase. Magnitudes of rising delays of the first-side scan signals SOL1 to SOL4 may be RT1>RT2>RT3>RT4.

Moreover, voltages of the Q node corresponding to falling edges of the four scan clocks SCLK1 to SCLK4 may differ, and due to this, a falling delay deviation may occur between the first-side scan signals SOL1 to SOL4. As a voltage of the Q node decreases, a falling delay may increase. Magnitudes of falling delays of the first-side scan signals SOL1 to SOL4 may be FT1<FT2<FT3<FT4.

Such an output characteristic deviation between the first-side scan signals SOL1 to SOL4 may cause a charge deviation between pixel lines, and thus, should be sensed and compensated for.

Referring to FIG. 4, in the second-side stage STR, four scan clocks SCLK1 to SCLK4 may be output as four second-side scan signals SOR1 to SOR4 by the common Q node voltage. The four scan clocks SCLK1 to SCLK4 may be delayed in phase by one horizontal period 1HT.

However, voltages of a Q node corresponding to rising edges of the four scan clocks SCLK1 to SCLK4 may differ, and due to this, a rising delay deviation may occur between the second-side scan signals SOR1 to SOR4. As a voltage of the Q node decreases, a rising delay may increase. Magnitudes of rising delays of the second-side scan signals SOR1 to SOR4 may be RT1>RT2>RT3>RT4.

Moreover, voltages of the Q node corresponding to falling edges of the four scan clocks SCLK1 to SCLK4 may differ, and due to this, a falling delay deviation may occur between the second-side scan signals SOR1 to SOR4. As a voltage of the Q node decreases, a falling delay may increase. Magnitudes of falling delays of the second-side scan signals SOR1 to SOR4 may be FT1<FT2<FT3<FT4.

Such an output characteristic deviation between the second-side scan signals SOR1 to SOR4 may cause a charge deviation between pixel lines, and thus, should be sensed and compensated for.

Figure 5:
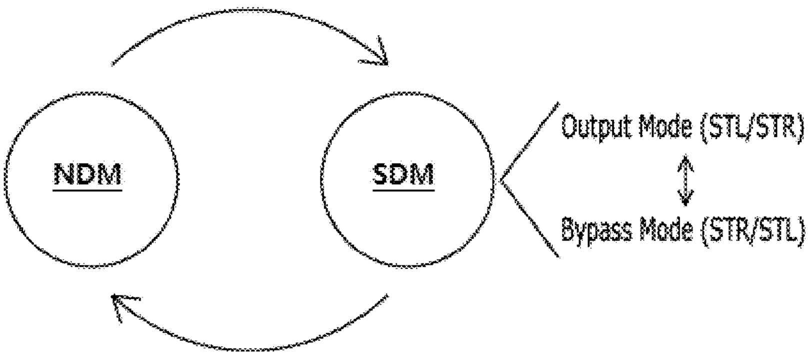
FIG. 5 is a diagram for describing an operation time of a sensing driving mode SDM for detecting an output characteristic of a scan signal in a display device according to one embodiment of the present disclosure.

FIG. 5 is a diagram for describing an operation time of a sensing driving mode SDM for detecting an output characteristic of a scan signal in a display device according to one embodiment of the present disclosure.

Referring to FIG. 5, the display device according to the present disclosure may further include a sensing driving mode SDM in addition to a normal driving mode NDM.

The normal driving mode NDM may be a driving mode for writing image data in a display panel, and the sensing driving mode SDM may be a driving mode for detecting an output characteristic of a scan signal.

The normal driving mode NDM and the sensing driving mode SDM may be temporally divided and performed based on control by a timing controller.

The normal driving mode NDM may be performed in a vertical active period of each frame.

The sensing driving mode SDM may be performed in a power on period until before a screen is powered on after a system power is applied. The sensing driving mode SDM may be performed in a power off period until before the system power is released after the screen is powered off. The sensing driving mode SDM may be performed in a vertical blank period of each frame.

Unlike the normal driving mode NDM, in the sensing driving mode SDM, the first-side stage STL and the second-side stage STR of FIG. 2 may differently operate.

In the sensing driving mode SDM for detecting an output characteristic of a first-side scan signal, the first-side stage STL may operate in an output mode, and the second-side stage STR may operate in a bypass mode. An output characteristic of the first-side scan signal may bypass the second-side stage STR and may be sensed by the second output and sensing circuit 140R.

In the sensing driving mode SDM for detecting an output characteristic of a second-side scan signal, the second-side stage STR may operate in the output mode, and the first-side stage STL may operate in the bypass mode. An output characteristic of the second-side scan signal may bypass the first-side stage STL and may be sensed by the first output and sensing circuit 140L.

Figure 6:
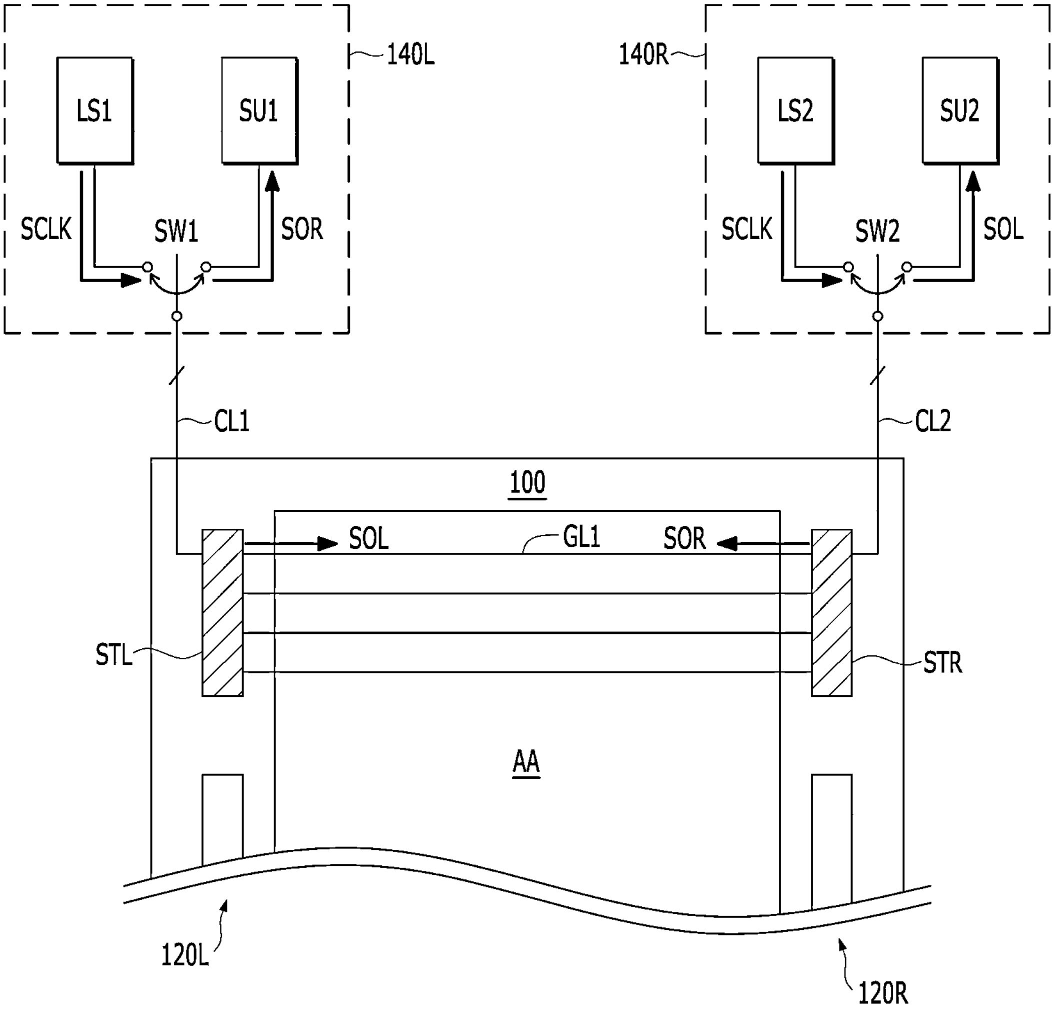
FIG. 6 is a diagram illustrating a first output and sensing circuit connected to a first-side stage and a second output and sensing circuit connected to a second-side stage according to one embodiment of the present disclosure.

FIG. 6 is a diagram illustrating a first output and sensing circuit connected to a first-side stage and a second output and sensing circuit connected to a second-side stage according to one embodiment of the present disclosure.

Referring to FIG. 6, a first-side stage STL and a second-side stage STR may drive four gate lines at both sides. For example, the first-side stage STL may supply a first-side scan signal SOL to one side of a gate line GL1, and the second-side stage STR may supply a second-side scan signal SOR, having the same phase as that of the first-side scan signal SOL, to the other side of the gate line GL1.

The first output and sensing circuit 140L may be connected to the first-side stage STL through four first clock lines CL1. The first output and sensing circuit 140L may include a first level shifter LS1 which outputs four first-side scan clocks SCLK to the four first clock lines CL1 and a first sensing circuit SU1 which selectively senses four second-side scan signals SOR input through the four first clock lines CL1. The first output and sensing circuit 140L may further include four first switches SW1 for selectively connecting the four first clock lines CL1 to one of the first level shifter LS1 and the first sensing circuit SU1.

In the normal driving mode NDM, the first switches SW1 may be always connected to only the first level shifter LS1. In the sensing driving mode SDM, the first switches SW1 may be selectively connected to one of the first level shifter LS1 and the first sensing circuit SU1.

The second output and sensing circuit 140R may be connected to the second-side stage STR through four second clock lines CL2. The second output and sensing circuit 140R may include a second level shifter LS2 which outputs four second-side scan clocks SCLK to the four second clock lines CL2 and a second sensing circuit SU2 which selectively senses four first-side scan signals SOL input through the four second clock lines CL2. The second output and sensing circuit 140R may further include four second switches SW2 for selectively connecting the four second clock lines CL2 to one of the second level shifter LS2 and the second sensing circuit SU2.

In the normal driving mode NDM, the second switches SW2 may be always connected to only the second level shifter LS2. In the sensing driving mode SDM, the second switches SW2 may be selectively connected to one of the second level shifter LS2 and the second sensing circuit SU2.

Figure 7:
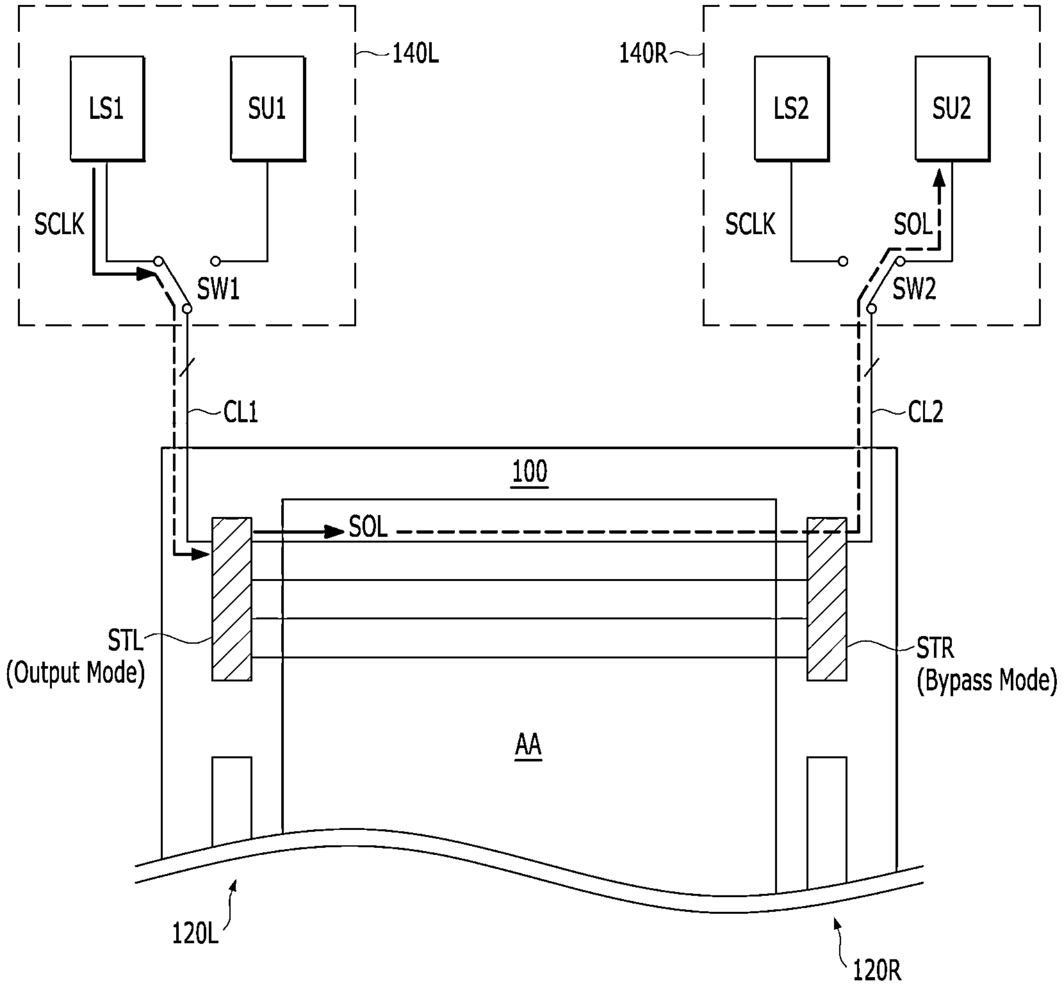
FIG. 7 is a diagram illustrating an example where a first-side stage operates in an output mode for detecting an output characteristic of a first-side scan signal, and a second-side stage operates in a bypass mode according to one embodiment of the present disclosure.

Referring to FIG. 7, in a sensing driving mode SDM for detecting an output characteristic of a first-side scan signal SOL, a first-side stage STL may operate in the output mode, and a second-side stage STR may operate in the bypass mode.

To this end, the first-side stage STL may be connected to a first level shifter LS1 of a first output and sensing circuit 140L through one of first clock lines CL1 and one of first switches SW1 and may be supplied with a first-side scan clock SCLK from the first level shifter LS1. The first-side stage STL may receive the first-side scan clock SCLK to output a first-side scan signal SOL to a gate line.

The first-side scan signal SOL may be supplied to the second-side stage STR through the gate line. The second-side stage STR may be connected to a second sensing circuit SU2 of a second output and sensing circuit 140R through one of second clock lines CL2 and one of second switches SW2 and may supply the first-side scan clock SCLK to the second sensing circuit SU2 of the second output and sensing circuit 140R.

Figure 8:
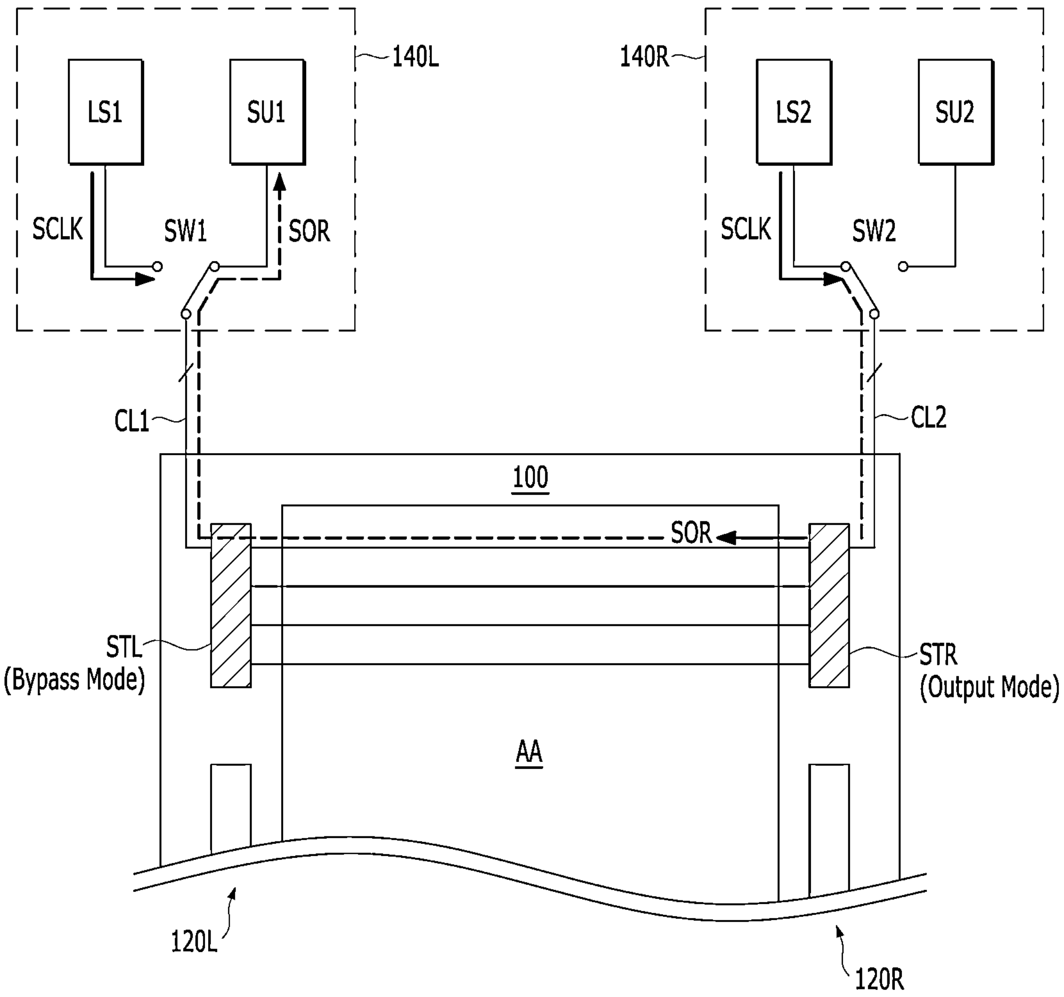
FIG. 8 is a diagram illustrating an example where a second-side stage operates in an output mode for detecting an output characteristic of a second-side scan signal, and a first-side stage operates in a bypass mode according to one embodiment of the present disclosure.

Referring to FIG. 8, in a sensing driving mode SDM for detecting an output characteristic of a second-side scan signal SOR, a second-side stage STR may operate in the output mode, and a first-side stage STL may operate in the bypass mode.

To this end, the second-side stage STR may be connected to a second level shifter LS2 of a second output and sensing circuit 140R through one of second clock lines CL2 and one of second switches SW2 and may be supplied with a second-side scan clock SCLK from the second level shifter LS2. The second-side stage STR may receive the second-side scan clock SCLK to output a second-side scan signal SOR to a gate line.

The second-side scan signal SOR may be supplied to the first-side stage STL through the gate line. The first-side stage STL may be connected to a first sensing circuit SU1 of a first output and sensing circuit 140L through one of first clock lines CL1 and one of first switches SW1 and may supply the second-side scan clock SCLK to the first sensing circuit SU1 of the first output and sensing circuit 140L.

Figure 9:
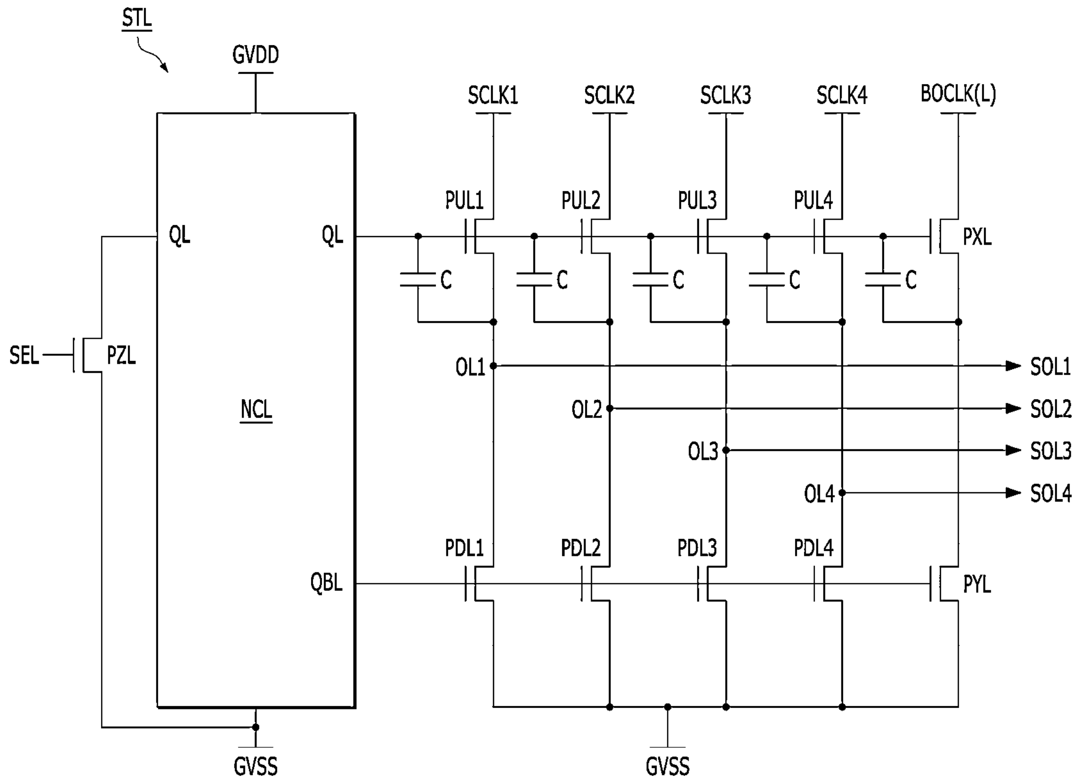
FIG. 9 is a diagram illustrating a circuit configuration of a first-side stage according to one embodiment of the present disclosure.

FIG. 9 is a diagram illustrating a circuit configuration of a first-side stage STL according to one embodiment of the present disclosure.

Referring to FIG. 9, the first-side stage STL may include a first-side node controller NCL which controls a voltage of a first-side Q node QL and a voltage of a first-side QB node QBL, first-side pull-up elements PUL1 to PUL4, a first-side boot pull-up element PXL, first-side pull-down elements PDL1 to PDL4, a first-side boot pull-down element PYL, and a first-side discharge element PZL.

Gate electrodes of the first-side pull-up elements PUL1 to PUL4 and a gate electrode of the first-side boot pull-up element PXL may be connected to the first-side Q node QL. Gate electrodes of the first-side pull-down elements PDL1 to PDL4 and a gate electrode of the first-side boot pull-down element PYL may be connected to the first-side QB node QBL.

The first-side pull-up elements PUL1 to PUL4 and the first-side pull-down elements PDL1 to PDL4 may be connected to each other through first-side output nodes OL1 to OLA. Drain electrodes of the first-side pull-up elements PUL1 to PUL4 may be connected to input terminals of first-side scan clocks SCLK1 to SCLK4. Source electrodes of the first-side pull-up elements PUL1 to PUL4 may be connected to the first-side output nodes OL1 to OLA. Drain electrodes of the first-side pull-down elements PDL1 to PDL4 may be connected to the first-side output nodes OL1 to OL4. Source electrodes of the first-side pull-down elements PDL1 to PDL4 may be connected to a low-level voltage source GVSS. The first-side output nodes OL1 to OL4 may be connected to one sides of gate lines.

A drain electrode of the first-side boot pull-up element PXL may be connected to an input terminal of a first-side boot clock BOCLK(L). A source electrode of the first-side boot pull-up element PXL may be connected to a drain electrode of the first-side boot pull-down element PYL. A source electrode of the first-side boot pull-down element PYL may be connected to the low-level voltage source GVSS.

A capacitor C may be connected between a gate electrode and a source electrode of each of the first-side pull-up elements PUL1 to PUL4 and the first-side boot pull-up element PXL.

A first-side control signal SEL may be supplied to a gate electrode of the first-side discharge element PZL, a drain electrode of the first-side discharge element PZL may be connected to the first-side Q node QL, and a source electrode of the first-side discharge element PZL may be connected to the low-level voltage source GVSS.

Figure 10:
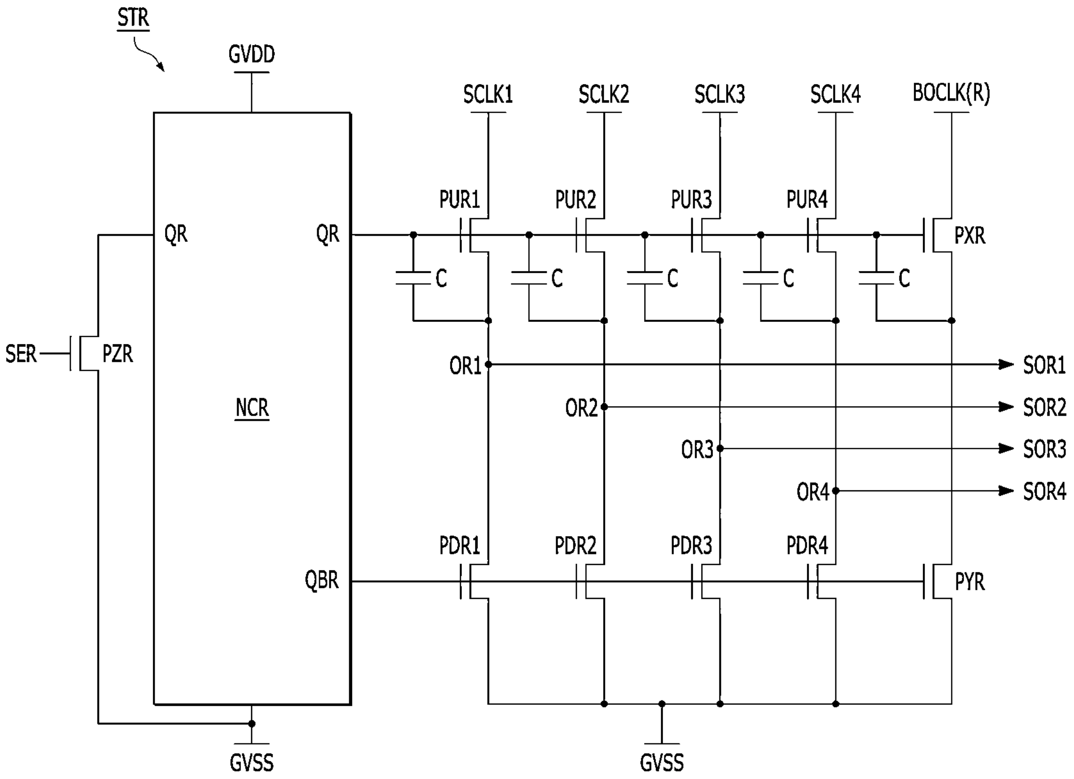
FIG. 10 is a diagram illustrating a circuit configuration of a second-side stage according to one embodiment of the present disclosure.

FIG. 10 is a diagram illustrating a circuit configuration of a second-side stage STR according to one embodiment of the present disclosure.

Referring to FIG. 10, the second-side stage STR may include a second-side node controller NCR which controls a voltage of a second-side Q node QR and a voltage of a second-side QB node QBR, second-side pull-up elements PUR1 to PUR4, a second-side boot pull-up element PXR, second-side pull-down elements PDR1 to PDR4, a second-side boot pull-down element PYR, and a second-side discharge element PZR.

Gate electrodes of the second-side pull-up elements PUR1 to PUR4 and a gate electrode of the second-side boot pull-up element PXR may be connected to the second-side Q node QR. Gate electrodes of the second-side pull-down elements PDR1 to PDR4 and a gate electrode of the second-side boot pull-down element PYR may be connected to the second-side QB node QBR.

The second-side pull-up elements PUR1 to PUR4 and the second-side pull-down elements PDR1 to PDR4 may be connected to each other through second-side output nodes OR1 to OR4. Drain electrodes of the second-side pull-up elements PUR1 to PUR4 may be connected to input terminals of second-side scan clocks SCLK1 to SCLK4. Source electrodes of the second-side pull-up elements PUR1 to PUR4 may be connected to the second-side output nodes OR1 to OR4. Drain electrodes of the second-side pull-down elements PDR1 to PDR4 may be connected to the second-side output nodes OR1 to OR4. Source electrodes of the second-side pull-down elements PDR1 to PDR4 may be connected to the low-level voltage source GVSS. The second-side output nodes OR1 to OR4 may be connected to the other sides of the gate lines.

A drain electrode of the second-side boot pull-up element PXR may be connected to an input terminal of a second-side boot clock BOCLK(R). A source electrode of the second-side boot pull-up element PXR may be connected to a drain electrode of the second-side boot pull-down element PYR. A source electrode of the second-side boot pull-down element PYR may be connected to the low-level voltage source GVSS.

A capacitor C may be connected between a gate electrode and a source electrode of each of the second-side pull-up elements PUR1 to PUR4 and the second-side boot pull-up element PXR.

A second-side control signal SER may be supplied to a gate electrode of the second-side discharge element PZR, a drain electrode of the second-side discharge element PZR may be connected to the second-side Q node QR, and a source electrode of the second-side discharge element PZR may be connected to the low-level voltage source GVSS.

Figure 11:
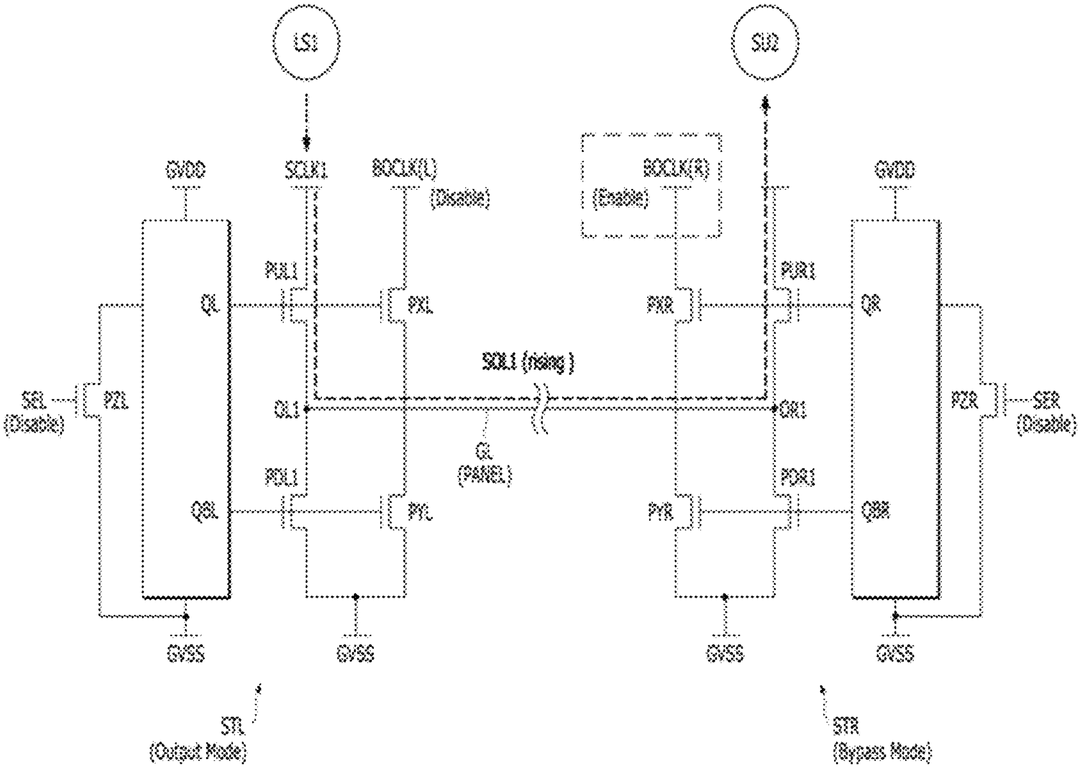
FIGS. 11, 12, and 13 are diagrams for describing detailed operations of transistors included in first-side and second-side stages when detecting a rising characteristic of a first-side scan signal according to one embodiment of the present disclosure.
Figure 12:
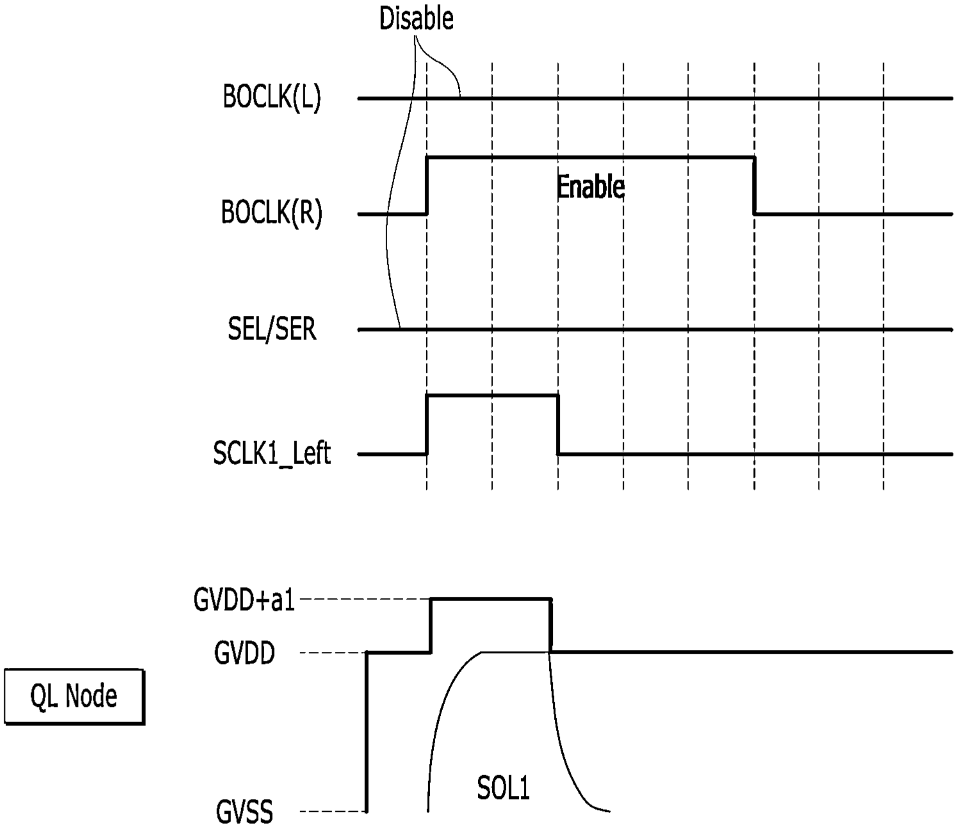
Figure 13:
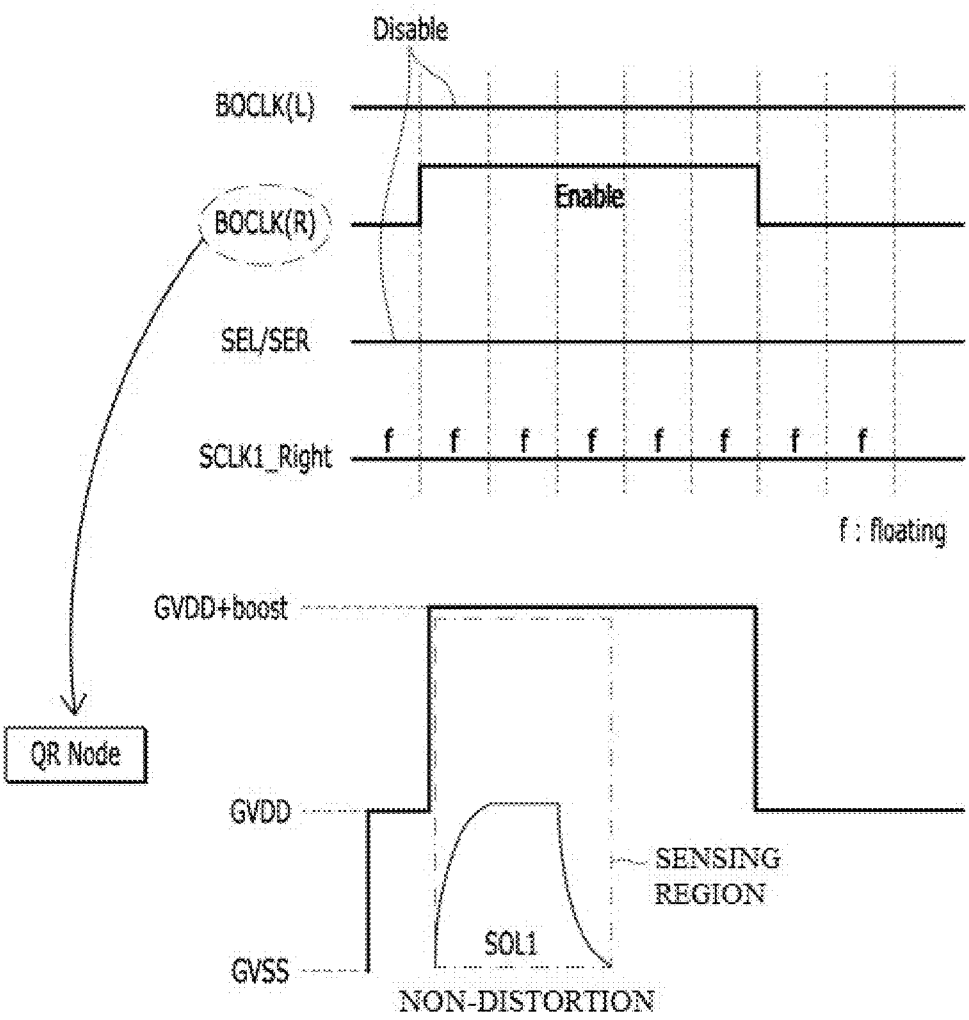

FIGS. 11, 12, and 13 are diagrams for describing detailed operations of transistors included in first-side and second-side stages when detecting a rising characteristic of a first-side scan signal according to one embodiment of the present disclosure.

Referring to FIG. 11, in a sequence which detects an output characteristic (a rising delay characteristic) of a first-side scan signal SOL1 in a second output and sensing circuit 140R, a first-side stage STL may operate in the output mode, and a second-side stage STR may operate in the bypass mode.

A first level shifter LS1 of a first output and sensing circuit 140L may supply a first-side scan clock SCLK1, needed for generating a first-side scan signal SOL1, to the first-side stage STL through a first clock line.

Referring to FIG. 12, the first-side stage STL may operate in the output mode, and thus, may generate the first-side scan signal SOL1 based on the first-side scan clock SCLK1 to output to a gate line GL, while a first bootstrapping operation of bootstrapping a voltage of a first-side Q node QL to GVDD+a1 which is higher than a high-level voltage source GVDD. At this time, a first-side boot clock BOCLK(L) and a first-side control signal SEL may be disabled so that a rising delay characteristic of the first-side scan signal SOL1 is accurately reflected in an output waveform of the first-side scan signal SOL1.

Referring to FIG. 13, the second-side stage STR may operate in the bypass mode, and thus, may bypass the first-side scan signal SOL1 from the gate line GL to a second clock line while a second bootstrapping operation of bootstrapping a voltage of a second-side Q node QR to GVDD+boost which is higher than the high-level voltage source GVDD. At this time, the voltage "GVDD+boost" of the second-side Q node QR may be higher than the voltage "GVDD+a1" of the first-side Q node QL as the second-side boot clock BOCLK(R) is enabled, and thus, signal distortion occurring when the first-side scan signal SOL1 is bypassed may be minimized in the second-side stage STR. That is, when the second-side boot clock BOCLK(R) is enabled, a bypassing effect of the second-side stage STR may be enhanced. Also, the second-side control signal SER may be disabled for a bypassing operation of the second-side stage STR.

Referring to FIG. 12, an enable period (i.e., a pulse period) of the second-side boot clock BOCLK(R) may overlap an enable period (i.e., a pulse period) of the first-side scan clock SCLK1. Furthermore, in order to secure the stability of an operation, a width of the enable period of the second-side boot clock BOCLK(R) may be greater than that of the enable period of the first-side scan clock SCLK1.

Moreover, although not shown in the drawing, a sequence which detects an output characteristic (a rising delay characteristic) of a second-side scan signal SOR1 in a first output and sensing circuit 140L may be implemented as follows.

In the sequence, the second-side stage STR may operate in the output mode, and the first-side stage STL may operation in the bypass mode.

A second level shifter LS2 of a second output and sensing circuit 140R may supply a second-side scan clock SCLK1, needed for generating a second-side scan signal SOR1, to the second-side stage STR through a second clock line.

The second-side stage STR may operate in the output mode, and thus, may generate the second-side scan signal SOR1 based on the second-side scan clock SCLK1 to output to the gate line GL, while a first bootstrapping operation of bootstrapping a voltage of a second-side Q node QR to GVDD+a1 which is higher than the high-level voltage source GVDD. At this time, a second-side boot clock BOCLK(R) and a second-side control signal SER may be disabled so that a rising delay characteristic of the second-side scan signal SOR1 is accurately reflected in an output waveform of the second-side scan signal SOR1.

The first-side stage STL may operate in the bypass mode, and thus, may bypass the second-side scan signal SOR1 from the gate line GL to a first clock line while a second bootstrapping operation of bootstrapping the voltage of the first-side Q node QL to GVDD+boost which is higher than the high-level voltage source GVDD. At this time, the voltage "GVDD+boost" of the first-side Q node QL may be higher than the voltage "GVDD+a1" of the second-side Q node QR as the first-side boot clock BOCLK(L) is enabled, and thus, signal distortion occurring when the second-side scan signal SOR1 is bypassed may be minimized in the first-side stage STL. That is, when the first-side boot clock BOCLK(L) is enabled, a bypassing effect of the first-side stage STL may be enhanced. Also, the first-side control signal SEL may be disabled for a bypassing operation of the first-side stage STL.

An enable period (i.e., a pulse period) of the first-side boot clock BOCLK(L) may overlap an enable period (i.e., a pulse period) of the second-side scan clock SCLK1. Furthermore, in order to secure the stability of an operation, a width of the enable period of the first-side boot clock BOCLK(L) may be greater than that of the enable period of the second-side scan clock SCLK1.

Figure 14:
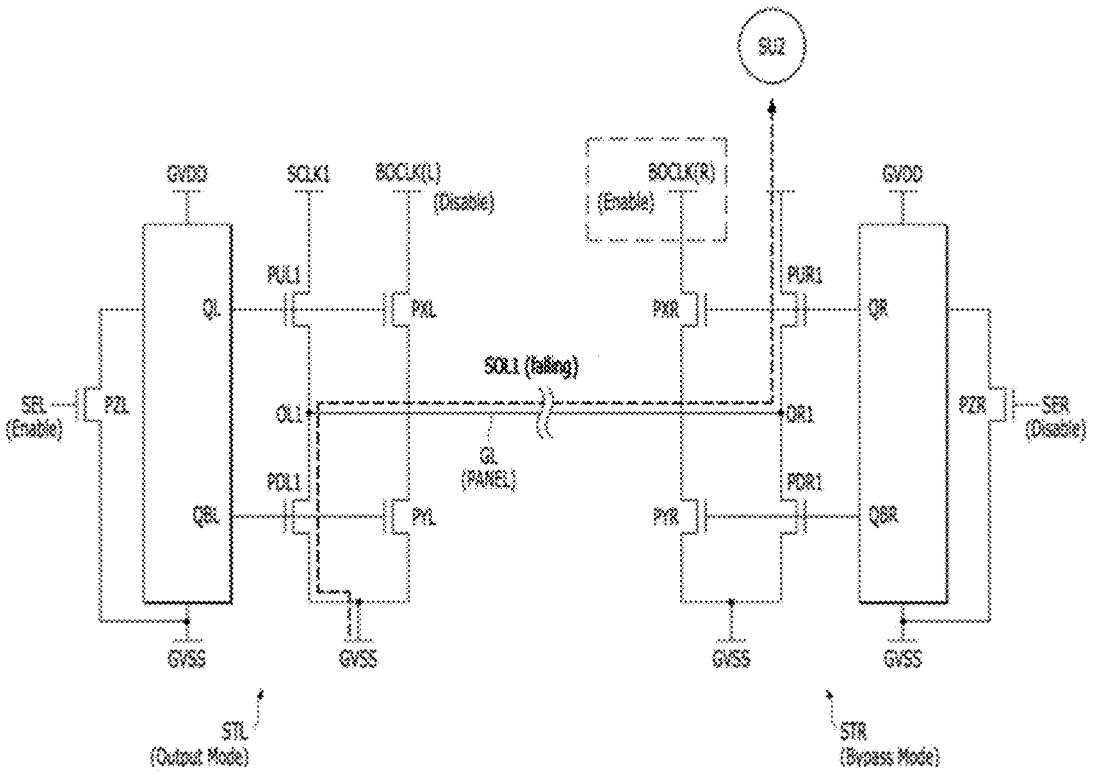
FIGS. 14, 15, and 16 are diagrams for describing detailed operations of transistors included in first-side and second-side stages when detecting a falling characteristic of a first-side scan signal according to one embodiment of the present disclosure.
Figure 15:
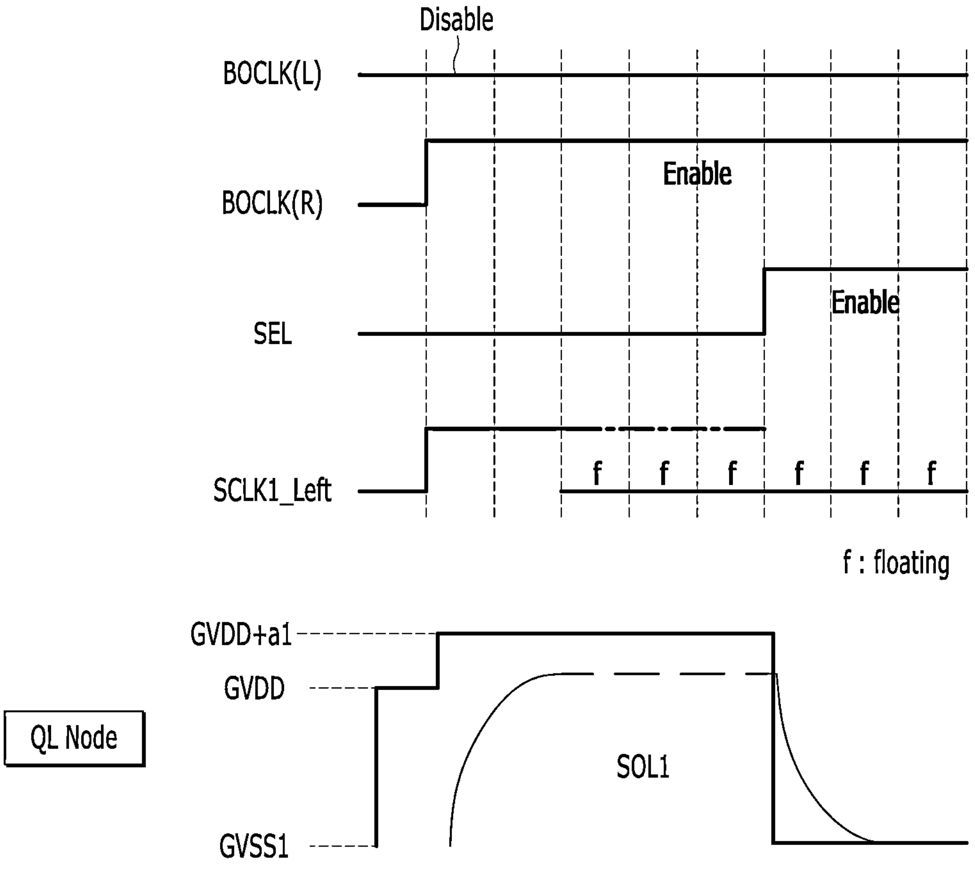
Figure 16:
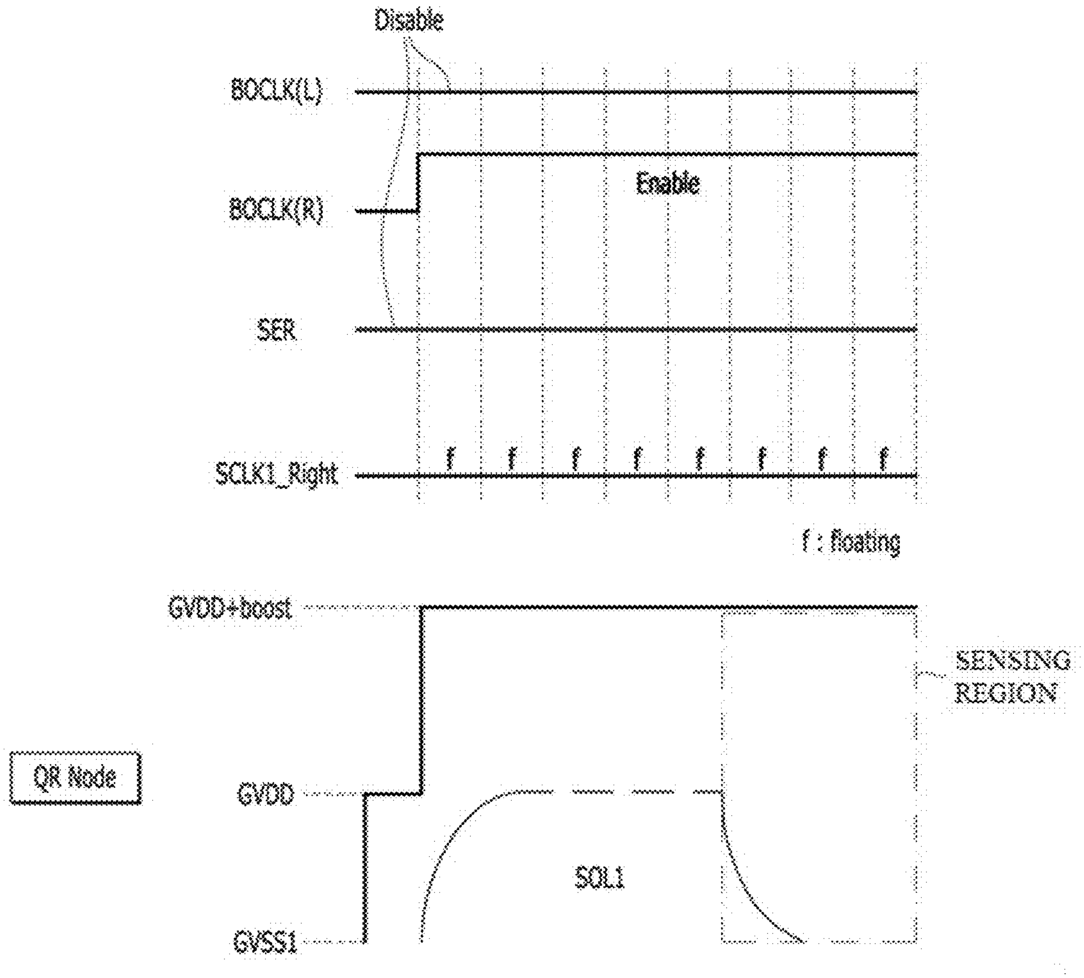

FIGS. 14, 15, and 16 are diagrams for describing detailed operations of transistors included in first-side and second-side stages when detecting a falling characteristic of a first-side scan signal according to one embodiment of the present disclosure.

Referring to FIG. 14, in a sequence which detects an output characteristic (a rising delay characteristic) of a first-side scan signal SOL1 in a second output and sensing circuit 140R, a first-side stage STL may operate in the output mode, and a second-side stage STR may operate in the bypass mode.

A first level shifter LS1 of a first output and sensing circuit 140L may supply a first-side scan clock SCLK1, needed for generating a first-side scan signal SOL1, to the first-side stage STL through a first clock line.

Referring to FIG. 15, the first-side stage STL may operate in the output mode, and thus, may generate the first-side scan signal SOL1 based on the first-side scan clock SCLK1 to output to a gate line GL, while a first bootstrapping operation of bootstrapping a voltage of a first-side Q node QL to GVDD+a1 which is higher than a high-level voltage source GVDD. At this time, a first-side boot clock BOCLK(L) may be disabled and a first-side control signal SEL may be enabled, so that a rising delay characteristic of the first-side scan signal SOL1 is accurately reflected in an output waveform of the first-side scan signal SOL1.

Referring to FIG. 16, the second-side stage STR may operate in the bypass mode, and thus, may bypass the first-side scan signal SOL1 from the gate line GL to a second clock line while a second bootstrapping operation of bootstrapping a voltage of a second-side Q node QR to GVDD+boost which is higher than the high-level voltage source GVDD. At this time, the voltage "GVDD+boost" of the second-side Q node QR may be higher than the voltage "GVDD+a1" of the first-side Q node QL as the second-side boot clock BOCLK(R) is enabled, and thus, signal distortion occurring when the first-side scan signal SOL1 is bypassed may be minimized in the second-side stage STR. That is, when the second-side boot clock BOCLK(R) is enabled, a bypassing effect of the second-side stage STR may be enhanced. Also, the second-side control signal SER may be disabled for a bypassing operation of the second-side stage STR.

Referring to FIG. 15, an enable period (i.e., a pulse period) of the second-side boot clock BOCLK(R) may overlap an enable period (i.e., a pulse period) of the first-side scan clock SCLK1. Furthermore, in order to secure the stability of an operation, a width of the enable period of the second-side boot clock BOCLK(R) may be greater than that of the enable period of the first-side scan clock SCLK1.

For a stable operation, the enable period of the second-side boot clock BOCLK(R) may overlap an enable period of the first-side control signal SEL.

For a stable operation, the enable period of the first-side control signal SEL may not overlap the enable period of the first-side scan clock SCLK1 also.

Moreover, although not shown in the drawing, a sequence which detects an output characteristic (a falling delay characteristic) of the second-side scan signal SOR1 in the first output and sensing circuit 140L may be implemented as follows.

In the sequence, the second-side stage STR may operate in the output mode, and the first-side stage STL may operation in the bypass mode.

A second level shifter LS2 of the second output and sensing circuit 140R may supply a second-side scan clock SCLK1, needed for generating the second-side scan signal SOR1, to the second-side stage STR through a second clock line.

The second-side stage STR may operate in the output mode, and thus, may generate the second-side scan signal SOR1 based on the second-side scan clock SCLK1 to output to the gate line GL, while a first bootstrapping operation of bootstrapping a voltage of the second-side Q node QR to GVDD+a1 which is higher than the high-level voltage source GVDD. At this time, the second-side boot clock BOCLK(R) may be disabled and the second-side control signal SER may be enabled so that a falling delay characteristic of the second-side scan signal SOR1 is accurately reflected in an output waveform of the second-side scan signal SOR1.

The first-side stage STL may operate in the bypass mode, and thus, may bypass the second-side scan signal SOR1 from the gate line GL to a first clock line while a second bootstrapping operation of bootstrapping the voltage of the first-side Q node QL to GVDD+boost which is higher than the high-level voltage source GVDD. At this time, the voltage "GVDD+boost" of the first-side Q node QL may be higher than the voltage "GVDD+a1" of the second-side Q node QR as the first-side boot clock BOCLK(L) is enabled, and thus, signal distortion occurring when the second-side scan signal SOR1 is bypassed may be minimized in the first-side stage STL. That is, when the first-side boot clock BOCLK(L) is enabled, a bypassing effect of the first-side stage STL may be enhanced. Also, the first-side control signal SEL may be disabled for a bypassing operation of the first-side stage STL.

An enable period (i.e., a pulse period) of the first-side boot clock BOCLK(L) may overlap an enable period (i.e., a pulse period) of the second-side scan clock SCLK1. Furthermore, in order to secure the stability of an operation, a width of the enable period of the first-side boot clock BOCLK(L) may be greater than that of the enable period of the second-side scan clock SCLK1.

For a stable operation, the enable period of the first-side boot clock BOCLK(L) may overlap an enable period of the second-side control signal SER.

For a stable operation, the enable period of the second-side control signal SER may not overlap the enable period of the second-side scan clock SCLK1 also.

Figure 17:
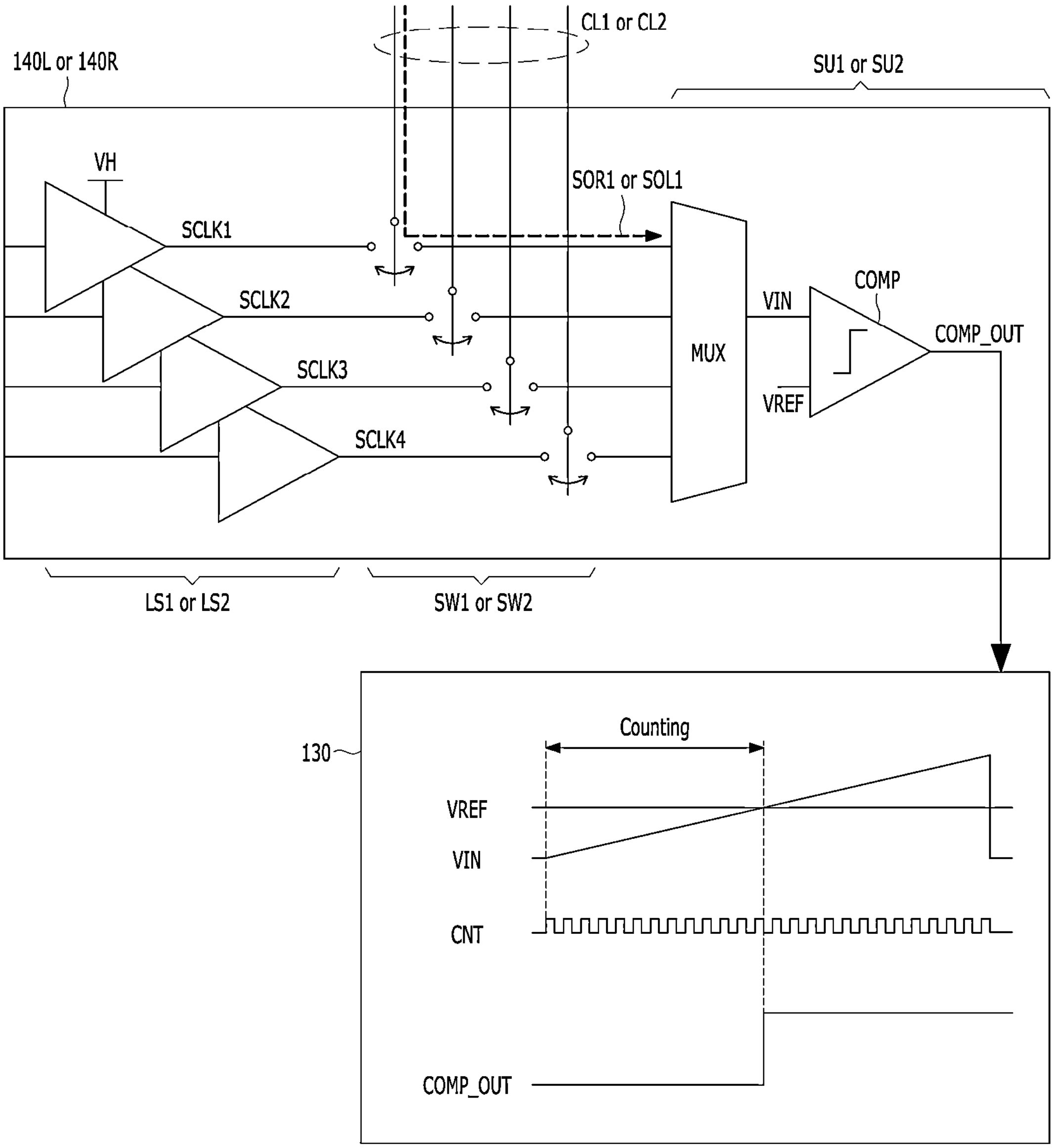
FIG. 17 is a diagram illustrating an operation of an output and sensing circuit in a sensing driving mode SDM according to one embodiment of the present disclosure.

FIG. 17 is a diagram illustrating an operation of an output and sensing circuit in a sensing driving mode SDM according to one embodiment of the present disclosure.

Referring to FIG. 17, a first output and sensing circuit 140L may include a first multiplexer MUX and a first comparator COMP. The first multiplexer circuit MUX may supply a comparator input terminal VIN with one of second-side scan signals SOR1 input through first clock lines CL1. The first comparator COMP may compare a comparator reference signal VREF with a first comparator input signal which is one of first-side scan signals SOL1 and may thus output a first comparison signal COMP_OUT. When the first comparator input signal is greater than the comparator reference signal VREF, a logic level of the first comparison signal COMP_OUT may be inverted from a low level to a high level.

Referring to FIG. 17, a second output and sensing circuit 140R may include a second multiplexer MUX and a second comparator COMP. The second multiplexer circuit MUX may supply a comparator input terminal VIN with one of first-side scan signals SOL1 input through second clock lines CL2. The second comparator COMP may compare the comparator reference signal VREF with a second comparator input signal which is one of the first-side scan signals SOL1 and may thus output a second comparison signal COMP_OUT. When the second comparator input signal is greater than the comparator reference signal VREF, a logic level of the second comparison signal COMP_OUT may be inverted from a low level to a high level.

Referring to FIG. 17, a timing controller 130 may count a time up to a logic inversion time of the first comparison signal COMP_OUT to output a rising delay or a falling delay of the second-side scan signal SOR1. Also, the timing controller 130 may count a time up to a logic inversion time of the second comparison signal COMP_OUT to output a rising delay or a falling delay of the first-side scan signal SOL1.

Figure 18:
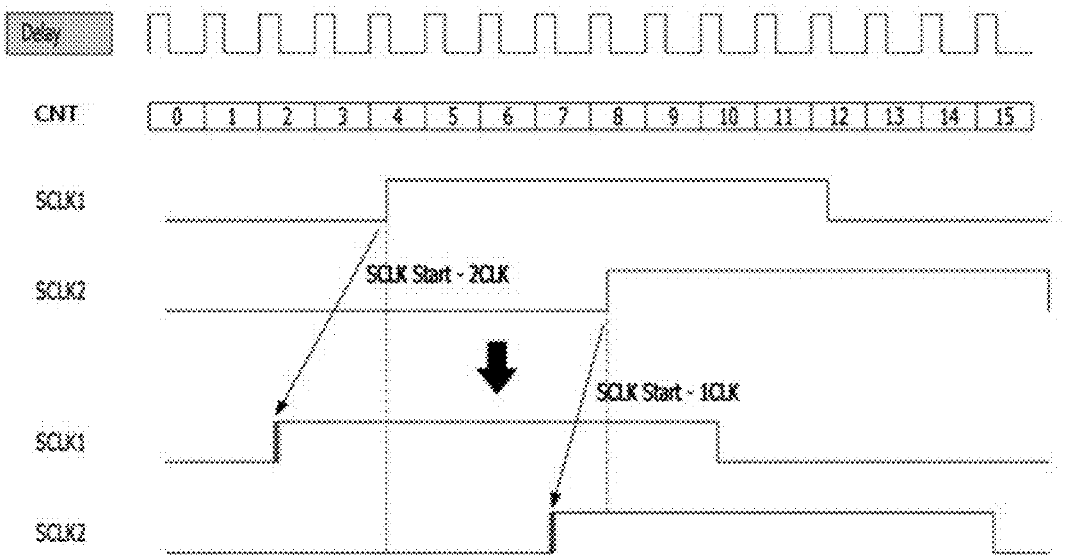
FIG. 18 is a diagram illustrating an operation of adjusting delays of scan clocks to compensate for an output characteristic deviation of scan signals according to one embodiment of the present disclosure.

FIG. 18 is a diagram illustrating an operation of adjusting delays of scan clocks so as to compensate for an output characteristic deviation of scan signals according to one embodiment of the present disclosure.

Referring to FIG. 18, the timing controller 130 may adjust a start point and an end point (i.e., an input timing) of each of scan clocks with respect to a count value CNT of a reference clock and may thus compensate for an output characteristic deviation of scan signals.

For example, the timing controller 130 may move up a start point of a first scan clock SCLK1 by a 2 reference clock 2CLK and may move up a start point of a second scan clock SCLK2 by a 1 reference clock 1CLK.

Figure 19:
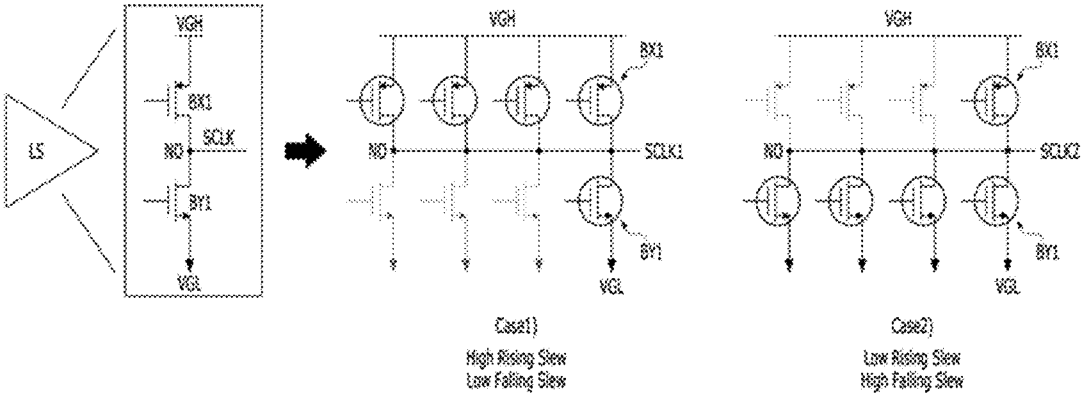
FIGS. 19 to 21 are diagrams illustrating an operation of adjusting an output slew rate of a level shifter to compensate for an output characteristic deviation of scan signals according to one embodiment of the present disclosure.
Figure 20:
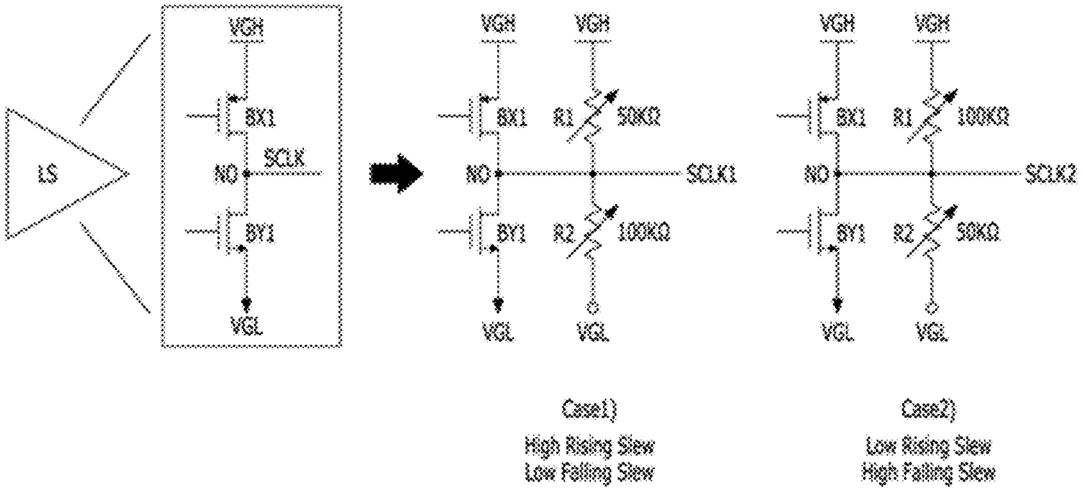
Figure 21:
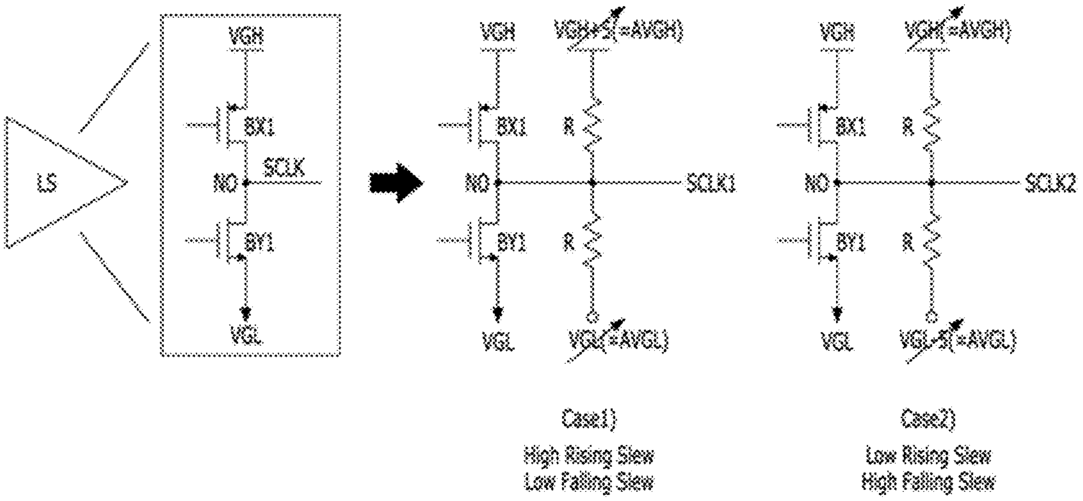

FIGS. 19 to 21 are diagrams illustrating an operation of adjusting an output slew rate of a level shifter so as to compensate for an output characteristic deviation of scan signals according to one embodiment of the present disclosure.

Referring to FIG. 19, the first output and sensing circuit 140L may include a first level shifter LS1 which includes a first buffer BX1 connected to a high-level voltage source VGH and a first output node NO and a second buffer BY1 connected to a low-level voltage source VGL and the first output node NO.

Moreover, the second output and sensing circuit 140R may include a second level shifter LS2 which includes a third buffer BX1 connected to the high-level voltage source VGH and a second output node NO and a fourth buffer BY1 connected to the low-level voltage source VGL and the second output node NO.

Referring to FIG. 19, a channel capacity of the first buffer BX1 and a channel capacity of the second buffer BY1 may be adjusted so that a delay of a first-side scan signal SOL is compensated for, and a channel capacity of the third buffer BX1 and a channel capacity of the fourth buffer BY1 may be adjusted so that a delay of a second-side scan signal SOR is compensated for.

For example, as in a case 1, the channel capacity of the buffer BX1 may be adjusted to be greater than the channel capacity of the buffer BY1, so that a rising slew rate of a scan signal SOL/SOR increases compared to a falling slew rate of the scan signal SOL/SOR.

On the other hand, as in a case 2, the channel capacity of the buffer BY1 may be adjusted to be greater than the channel capacity of the buffer BX1, so that a falling slew rate of the scan signal SOL/SOR increases compared to a rising slew rate of the scan signal SOL/SOR.

Referring to FIG. 20, the first output and sensing circuit 140L may include a first level shifter LS1 which includes a first buffer BX1 connected to a high-level voltage source VGH and a first output node NO and a second buffer BY1 connected to a low-level voltage source VGL and the first output node NO. The first level shifter LS1 may further include a first variable resistor R1 connected to the high-level voltage source VGH and the first output node NO and a second variable resistor R2 connected to the low-level voltage source VGL and the first output node NO.

Referring to FIG. 20, the second output and sensing circuit 140R may include a second level shifter LS2 which includes a third buffer BX1 connected to the high-level voltage source VGH and a second output node NO and a fourth buffer BY1 connected to the low-level voltage source VGL and the second output node NO. The second level shifter LS2 may further include a third variable resistor R1 connected to the high-level voltage source VGH and the second output node NO and a fourth variable resistor R2 connected to the low-level voltage source VGL and the second output node NO.

Referring to FIG. 20, the first variable resistor R1 and the second variable resistor R2 may be adjusted so that a delay of a first-side scan signal SOL is compensated for, and the third variable resistor R1 and the fourth variable resistor R2 may be adjusted so that a delay of a second-side scan signal SOR is compensated for.

For example, as in a case 1, a resistance value of the first variable resistor R1 may be adjusted to be less than a resistance value of the second variable resistor R2, so that a rising slew rate of a scan signal SOL/SOR increases compared to a falling slew rate of the scan signal SOL/SOR.

On the other hand, as in a case 2, a resistance value of the second variable resistor R2 may be adjusted to be less than a resistance value of the first variable resistor R1, so that a falling slew rate of the scan signal SOL/SOR increases compared to a rising slew rate of the scan signal SOL/SOR.

Referring to FIG. 21, the first output and sensing circuit 140L may include a first level shifter LS1 which includes a first buffer BX1 connected to a high-level voltage source VGH and a first output node NO and a second buffer BY1 connected to a low-level voltage source VGL and the first output node NO. The first level shifter LS1 may further include a resistor R connected to a first variable high-level voltage source AVGH and the first output node NO and a resistor R connected to a first variable low-level voltage source AVGL and the first output node NO.

Referring to FIG. 21, the second output and sensing circuit 140R may include a second level shifter LS2 which includes a third buffer BX1 connected to the high-level voltage source VGH and a second output node NO and a fourth buffer BY1 connected to the low-level voltage source VGL and the second output node NO. The second level shifter LS2 may further include a resistor R connected to a second variable high-level voltage source AVGH and the second output node NO and a resistor R connected to a second variable low-level voltage source AVGL and the second output node NO.

Referring to FIG. 21, the first variable high-level voltage source AVGH and the first variable low-level voltage source AVGL may be adjusted so that a delay of a first-side scan signal SOL is compensated for, and the second variable high-level voltage source AVGH and the second variable low-level voltage source AVGL may be adjusted so that a delay of a second-side scan signal SOR is compensated for.

For example, as in a case 1, the first variable high-level voltage source AVGH may be adjusted to be higher than the high-level voltage source VGH, and the first variable low-level voltage source AVGL may be adjusted to be equal to the low-level voltage source VGL, so that a rising slew rate of a scan signal SOL/SOR increases compared to a falling slew rate of the scan signal SOL/SOR.

On the other hand, as in a case 2, the second variable high-level voltage source AVGH may be adjusted to be equal to the high-level voltage source VGH, and the second variable low-level voltage source AVGL may be adjusted to be lower than the low-level voltage source VGL, so that a falling slew rate of the scan signal SOL/SOR increases compared to a rising slew rate of the scan signal SOL/SOR.

Figure 22:
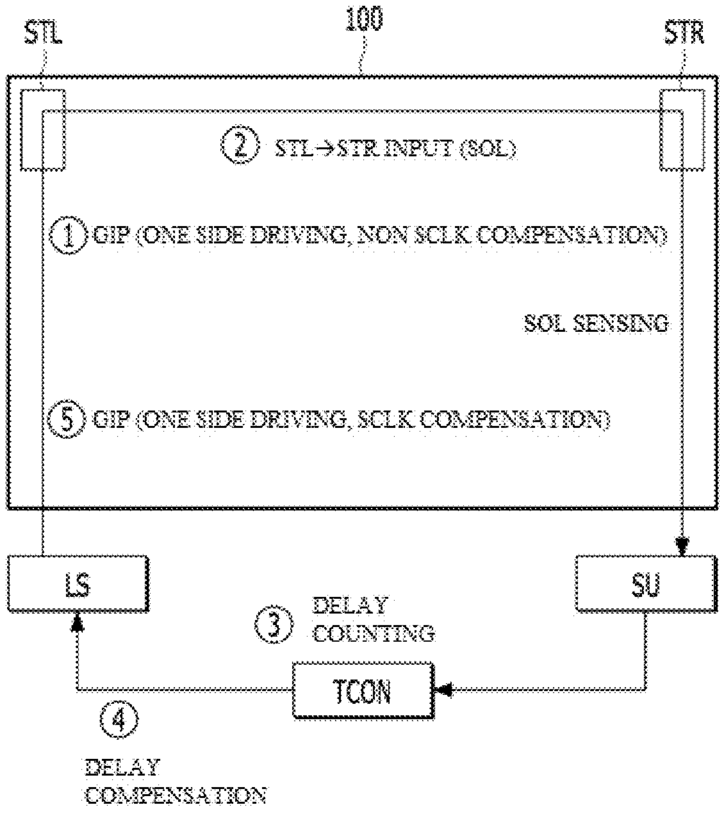
FIG. 22 is a schematic diagram for detecting and compensating for an output characteristic deviation of scan signals according to one embodiment of the present disclosure.

FIG. 22 is a schematic diagram for detecting and compensating for an output characteristic deviation of scan signals according to one embodiment of the present disclosure.

Referring to FIG. 22, a left level shifter LS may supply a scan clock, which is for detecting an output characteristic, to a left stage STL through a left clock line. A left scan signal SOL generated by the left stage STL may be supplied to a right stage STR through a gate line. The right stage STR may bypass the left scan signal SOL to a right clock line. A right sensing circuit SU may sense the left scan signal SOL input through the right clock line, and when a comparator input signal is greater than a comparator reference signal, the right sensing circuit SU may output a comparison signal where a logic level is inverted. A timing controller TCON may count a time up to a logic inversion time of the comparison signal to output a rising delay or a falling delay of the left scan signal SOL. Also, the timing controller TCON may count a time up to a logic inversion time of a second comparison signal COMP_OUT to output rising delay information or falling delay information about a first-side scan signal SOL1. The timing controller TCON may compensate for a rising delay of the first-side scan signal SOL1, based on the rising delay information about the first-side scan signal SOL1, and may compensate for a falling delay of the first-side scan signal SOL1, based on the falling delay information about the first-side scan signal SOL1.

The present disclosure may realize the following effects.

The present disclosure may provide a display device and a driving method thereof, which may detect an output characteristic deviation of scan signals.

The present disclosure may detect and compensate for an output characteristic deviation of scan signals.

The effects according to the present disclosure are not limited to the above examples, and other various effects may be included in the specification.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

What is claimed is:

1. A display device comprising:

a gate line;

a first-side stage configured to supply a first-side scan signal to a first side of the gate line;

a second-side stage configured to supply a second-side scan signal that has a same phase as a phase of the first-side scan signal to a second side of the gate line;

a first output and sensing circuit connected to the first-side stage through a first clock line; and a second output and sensing circuit connected to the second-side stage through a second clock line, wherein the first-side stage operates in an output mode and the second-side stage operates in a bypass mode, so as to detect an output characteristic of the first-side scan signal in the second output and sensing circuit, and the second-side stage operates in the output mode and the first-side stage operates in the bypass mode, so as to detect an output characteristic of the second-side scan signal in the first output and sensing circuit.

2. The display device of claim 1, wherein the first-side stage comprises a first-side Q node and the second-side stage comprises a second-side Q node, wherein a voltage of the second-side Q node is greater than a voltage of the first-side Q node while an output characteristic of the first-side scan signal is being detected in the second output and sensing circuit, and wherein the voltage of the first-side Q node is greater than the voltage of the second-side Q node while an output characteristic of the second-side scan signal is being detected in the first output and sensing circuit.

3. The display device of claim 2, wherein, in a sequence which detects an output characteristic of the first-side scan signal in the second output and sensing circuit, a first level shifter of the first output and sensing circuit supplies a first-side scan clock that is needed for generating the first-side scan signal to the first-side stage through the first clock line, and a second sensing circuit of the second output and sensing circuit is supplied with the first-side scan signal from the second-side stage through the second clock line.

4. The display device of claim 2, wherein, in a sequence which detects an output characteristic of the second-side scan signal in the first output and sensing circuit, a second level shifter of the second output and sensing circuit supplies a second-side scan clock that is needed for generating the second-side scan signal to the second-side stage through the second clock line, and a first sensing circuit of the first output and sensing circuit is supplied with the second-side scan signal from the first-side stage through the first clock line.

5. The display device of claim 2, wherein the first-side stage comprises:

a first-side pull-up element configured to output a first-side scan clock as the first-side scan signal while the first-side Q node is enabled, a first-side boot pull-up element including a gate electrode connected to the first-side Q node and a drain electrode to which a first-side boot clock is applied; and a first-side discharge element including a gate electrode connected to a first-side control signal, a drain electrode connected to the first-side Q node, and a source electrode connected to a low-level voltage source, and wherein the second-side stage comprises:

a second-side pull-up element configured to output a second-side scan clock as the second-side scan signal while the second-side Q node is enabled, a second-side boot pull-up element including a gate electrode connected to the second-side Q node and a drain electrode to which a second-side boot clock is applied; and a second-side discharge element including a gate electrode connected to a second-side control signal, a drain electrode connected to the second-side Q node, and a source electrode connected to the low-level voltage source.

6. The display device of claim 5, wherein in a sequence which detects a rising output characteristic of the first-side scan signal in the second output and sensing circuit, the first-side boot clock, the first-side control signal, and the second-side control signal are disabled, and the second-side boot clock is enabled, wherein an enable period of the first-side scan clock overlaps an enable period of the second-side boot clock, and a width of the enable period of the second-side boot clock is greater than a width of the enable period of the first-side scan clock.

7. The display device of claim 5, wherein in a sequence which detects a rising output characteristic of the second-side scan signal in the first output and sensing circuit, the second-side boot clock, the first-side control signal, and the second-side control signal are disabled, and the first-side boot clock is enabled, wherein an enable period of the second-side scan clock overlaps an enable period of the first-side boot clock, and a width of the enable period of the first-side boot clock is greater than a width of the enable period of the second-side scan clock.

8. The display device of claim 5, wherein, in a sequence which detects a falling output characteristic of the first-side scan signal in the second output and sensing circuit, the first-side boot clock and the second-side control signal are disabled and the second-side boot clock and the first-side control signal are enabled, wherein an enable period of the first-side scan clock overlaps an enable period of the second-side boot clock, an enable period of the first-side control signal overlaps the enable period of the second-side boot clock, and the enable period of the first-side scan clock is non-overlapping with the enable period of the first-side control signal, wherein the enable period of the second-side boot clock is greater than the enable period of the first-side scan clock, and the enable period of the second-side boot clock is greater than the enable period of the first-side control signal.

9. The display device of claim 5, wherein in a sequence which detects a falling output characteristic of the second-side scan signal in the first output and sensing circuit, the second-side boot clock and the first-side control signal are disabled and the first-side boot clock and the second-side control signal are enabled, wherein an enable period of the second-side scan clock overlaps an enable period of the first-side boot clock, an enable period of the second-side control signal overlaps the enable period of the first-side boot clock, and the enable period of the second-side scan clock is non-overlapping with the enable period of the second-side control signal, wherein the enable period of the first-side boot clock is greater than the enable period of the second-side scan clock and the enable period of the first-side boot clock is greater than the enable period of the second-side control signal.

10. The display device of claim 1, wherein the first output and sensing circuit comprises a first comparator configured to compare the second-side scan signal with a comparator reference signal and outputs a first comparison signal, and the second output and sensing circuit comprises a second comparator configured to compare the first-side scan signal with the comparator reference signal and outputs a second comparison signal.

11. The display device of claim 10, further comprising:

a timing controller configured to count a time up to a logic inversion time of the first comparison signal and output a rising delay or a falling delay of the second-side scan signal, and count a time up to a logic inversion time of the second comparison signal and output a rising delay or a falling delay of the first-side scan signal.

12. The display device of claim 11, wherein the timing controller further adjusts an input timing of a first-side scan clock and compensates for a delay of the first-side scan signal, and further adjusts an input timing of a second-side scan clock and compensates for a delay of the second-side scan signal.

13. The display device of claim 10, wherein the first output and sensing circuit comprises a first level shifter including a first buffer connected to a high-level voltage source and a first output node and a second buffer connected to a low-level voltage source and the first output node, and the second output and sensing circuit comprises a second level shifter including a third buffer connected to the high-level voltage source and a second output node and a fourth buffer connected to the low-level voltage source and the second output node.

14. The display device of claim 13, wherein a channel capacity of the first buffer and a channel capacity of the second buffer are adjusted and a delay of the first-side scan signal is compensated, and a channel capacity of the third buffer and a channel capacity of the fourth buffer are adjusted and a delay of the second-side scan signal is compensated.

15. The display device of claim 13, wherein the first level shifter further comprises a first variable resistor connected to the high-level voltage source and the first output node and a second variable resistor connected to the low-level voltage source and the first output node, and wherein the first variable resistor and the second variable resistor are adjusted and a delay of the first-side scan signal is compensated.

16. The display device of claim 13, wherein the second level shifter further comprises a third variable resistor connected to the high-level voltage source and the second output node and a fourth variable resistor connected to the low-level voltage source and the second output node, and the third variable resistor and the fourth variable resistor are adjusted and a delay of the second-side scan signal is compensated.

17. The display device of claim 13, wherein the first level shifter further comprises a resistor connected to a first variable high-level voltage source and the first output node and a resistor connected to a first variable low-level voltage source and the first output node, and the first variable high-level voltage source and the first variable low-level voltage source are adjusted and that a delay of the first-side scan signal is compensated.

18. The display device of claim 13, wherein the second level shifter further comprises a resistor connected to a second variable high-level voltage source and the second output node and a resistor connected to a second variable low-level voltage source and the second output node, and the second variable high-level voltage source and the second variable low-level voltage source are adjusted and a delay of the second-side scan signal is compensated.

* * * * *